(12) United States Patent
Dropps et al.

(10) Patent No.: US 7,646,767 B2
(45) Date of Patent: *Jan. 12, 2010

(54) METHOD AND SYSTEM FOR PROGRAMMABLE DATA DEPENDANT NETWORK ROUTING

(75) Inventors: Frank R Dropps, Maple Grove, MN (US); Edward C McGlaughlin, Minneapolis, MN (US); Steven M Betker, Shoreview, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 648 days.

This patent is subject to a terminal disclaimer.

(21) Appl. No.: 10/894,978

(22) Filed: Jul. 20, 2004

(65) Prior Publication Data

US 2005/0030954 A1    Feb. 10, 2005

Related U.S. Application Data

(60) Provisional application No. 60/503,812, filed on Sep. 19, 2003, provisional application No. 60/537,933, filed on Jan. 21, 2004, provisional application No. 60/488,757, filed on Jul. 21, 2003, provisional application No. 60/532,965, filed on Dec. 29, 2003, provisional application No. 60/504,038, filed on Sep. 19, 2003, provisional application No. 60/495,212, filed on Aug. 14, 2003, provisional application No. 60/495,165, filed on Aug. 14, 2003, provisional application No. 60/503,809, filed on Sep. 19, 2003, provisional application No. 60/505,381, filed on Sep. 23, 2003, provisional application No. 60/505,195, filed on Sep. 23, 2003, provisional application No. 60/557,613, filed on Mar. 30, 2004, provisional application No. 60/505,075, filed on Sep. 23, 2003, provisional application No. 60/504,950, filed on Sep. 19, 2003, provisional application No. 60/532,967, filed on Dec. 29, 2003, provisional application No. 60/532,966, filed on Dec. 29, 2003, provisional application No. 60/550,250, filed on Mar. 4, 2004, provisional application No. 60/569,436, filed on May 7, 2004, provisional application No. 60/572,197, filed on May 18, 2004, provisional application No. 60/532,963, filed on Dec. 29, 2003.

(51) Int. Cl.
*H04L 12/28* (2006.01)

(52) U.S. Cl. ............... 370/389; 370/392; 370/395.31; 370/395.32; 370/404; 370/359; 370/428; 370/429; 370/474

(58) Field of Classification Search ............ 370/60, 370/216, 252, 321, 352, 401, 469, 395.32, 370/395.31, 429, 359, 389, 392, 404, 428, 370/474; 709/203, 208, 213, 226, 231, 245, 709/246; 710/36

See application file for complete search history.

(56) References Cited

U.S. PATENT DOCUMENTS

| | | |
|---|---|---|
| 4,081,612 A | 3/1978 | Hafner |
| 4,162,375 A | 7/1979 | Schilichte ............ 179/15 |
| 4,200,929 A | 4/1980 | Davidjuk et al. |
| 4,258,418 A | 3/1981 | Heath |
| 4,268,906 A | 5/1981 | Bourke et al. |
| 4,333,143 A | 6/1982 | Calder |
| 4,344,132 A | 8/1982 | Dixon et al. |
| 4,382,159 A | 5/1983 | Bowditch |
| 4,425,640 A | 1/1984 | Philip et al. ............ 370/58 |
| 4,449,182 A | 5/1984 | Rubinson et al. |
| 4,546,468 A | 10/1985 | Christmas et al. ......... 370/54 |
| 4,549,263 A | 10/1985 | Calder |
| 4,569,043 A | 2/1986 | Simmons et al. ......... 370/63 |
| 4,716,561 A | 12/1987 | Angell et al. |
| 4,725,835 A | 2/1988 | Schreiner et al. ....... 340/825.83 |
| 4,777,595 A | 10/1988 | Strecker et al. |
| 4,783,730 A | 11/1988 | Fischer |
| 4,783,739 A | 11/1988 | Calder |
| 4,803,622 A | 2/1989 | Bain, Jr. et al. |
| 4,821,034 A | 4/1989 | Anderson et al. .......... 340/825 |
| 4,860,193 A | 8/1989 | Bentley et al. |
| 4,964,119 A | 10/1990 | Endo et al. |
| 4,980,857 A | 12/1990 | Walter et al. |

| | | | | | |
|---|---|---|---|---|---|
| 5,025,370 A | 6/1991 | Koegel et al. | 5,974,547 A | 10/1999 | Klimenko |
| 5,051,742 A | 9/1991 | Hullett et al. | 5,978,359 A | 11/1999 | Caldara et al. |
| 5,090,011 A | 2/1992 | Fukuta et al. | 5,978,379 A | 11/1999 | Chan et al. |
| 5,115,430 A | 5/1992 | Hahne et al. | 5,983,292 A | 11/1999 | Nordstorm et al. |
| 5,129,064 A | 7/1992 | Fogg, Jr. et al. | 5,987,028 A | 11/1999 | Yang et al. ............... 370/380 |
| 5,144,622 A | 9/1992 | Takiyasu et al. ......... 370/85.13 | 5,999,528 A | 12/1999 | Chow et al. ............... 370/365 |
| 5,212,795 A | 5/1993 | Hendry | 6,006,340 A | 12/1999 | O'Connell |
| 5,249,279 A | 9/1993 | Schmenk et al. | 6,009,226 A | 12/1999 | Tsuji et al. |
| 5,258,751 A | 11/1993 | DeLuca et al. | 6,011,779 A | 1/2000 | Wills |
| 5,260,933 A | 11/1993 | Rouse | 6,014,383 A | 1/2000 | McCarty ..................... 370/453 |
| 5,260,935 A | 11/1993 | Turner | 6,021,128 A | 2/2000 | Hosoya et al. ............. 370/380 |
| 5,276,807 A | 1/1994 | Kodama et al. | 6,026,092 A | 2/2000 | Abu-Amara et al. |
| 5,280,483 A | 1/1994 | Kamoi et al. | 6,031,842 A | 2/2000 | Trevitt et al. |
| 5,291,481 A | 3/1994 | Doshi et al. | 6,046,979 A | 4/2000 | Bauman |
| 5,321,816 A | 6/1994 | Rogan et al. | 6,047,323 A | 4/2000 | Krause ....................... 709/227 |
| 5,339,311 A | 8/1994 | Turner | 6,049,802 A | 4/2000 | Waggener, Jr. et al. |
| 5,347,638 A | 9/1994 | Desai et al. | 6,055,603 A | 4/2000 | Ofer et al. |
| 5,367,520 A | 11/1994 | Cordell ......................... 370/60 | 6,055,618 A | 4/2000 | Thorson |
| 5,371,861 A | 12/1994 | Keener et al. | 6,061,360 A | 5/2000 | Miller et al. |
| 5,390,173 A | 2/1995 | Spinney et al. | 6,078,970 A | 6/2000 | Nordstorm |
| 5,425,022 A | 6/1995 | Clark et al. | 6,081,512 A | 6/2000 | Muller et al. ............... 370/256 |
| 5,448,702 A | 9/1995 | Garcia, Jr. et al. | 6,085,277 A | 7/2000 | Nordstorm et al. |
| 5,537,400 A | 7/1996 | Diaz et al. | 6,108,738 A | 8/2000 | Chambers et al. |
| 5,568,165 A | 10/1996 | Kimura | 6,108,778 A | 8/2000 | LaBerge |
| 5,568,167 A | 10/1996 | Galbi et al. | 6,115,761 A | 9/2000 | Daniel et al. |
| 5,568,614 A | 10/1996 | Mendelson et al. | 6,118,776 A | 9/2000 | Berman |
| 5,579,443 A | 11/1996 | Tatematsu et al. | 6,118,791 A | 9/2000 | Fichou et al. |
| 5,590,125 A | 12/1996 | Acampora et al. | 6,128,292 A | 10/2000 | Kim et al. ................... 370/356 |
| 5,594,672 A | 1/1997 | Hicks | 6,134,127 A | 10/2000 | Kirchberg |
| 5,598,541 A | 1/1997 | Malladi ....................... 395/286 | 6,138,176 A | 10/2000 | McDonald et al. |
| 5,610,745 A | 3/1997 | Bennett ....................... 359/139 | 6,144,668 A | 11/2000 | Bass et al. |
| 5,623,492 A | 4/1997 | Teraslinna | 6,147,976 A | 11/2000 | Shand et al. |
| 5,647,057 A | 7/1997 | Roden et al. | 6,151,644 A | 11/2000 | Wu |
| 5,666,483 A | 9/1997 | McClary | 6,158,014 A | 12/2000 | Henson |
| 5,671,365 A | 9/1997 | Binford et al. | 6,160,813 A | 12/2000 | Banks et al. ................. 370/422 |
| 5,677,909 A | 10/1997 | Heide | 6,185,203 B1 | 2/2001 | Berman |
| 5,687,172 A | 11/1997 | Cloonan et al. ............. 370/395 | 6,185,620 B1 | 2/2001 | Weber et al. |
| 5,701,416 A | 12/1997 | Thorson et al. | 6,201,787 B1 | 3/2001 | Baldwin et al. |
| 5,706,279 A | 1/1998 | Teraslinna | 6,209,089 B1 | 3/2001 | Selitrennikoff et al. |
| 5,732,206 A | 3/1998 | Mendel | 6,229,822 B1 | 5/2001 | Chow et al. |
| 5,740,467 A | 4/1998 | Chmielecki et al. | 6,230,276 B1 | 5/2001 | Hayden |
| 5,748,612 A | 5/1998 | Stoevhase et al. ........... 370/230 | 6,233,244 B1 | 5/2001 | Runaldue et al. |
| 5,757,771 A | 5/1998 | Li et al. | 6,240,096 B1 | 5/2001 | Book |
| 5,758,187 A | 5/1998 | Young | 6,246,683 B1 | 6/2001 | Connery et al. |
| 5,761,427 A | 6/1998 | Shah et al. | 6,247,060 B1 | 6/2001 | Boucher et al. |
| 5,764,927 A | 6/1998 | Murphy et al. | 6,252,891 B1 | 6/2001 | Perches |
| 5,768,271 A | 6/1998 | Seid et al. | 6,253,267 B1 | 6/2001 | Kim et al. |
| 5,768,533 A | 6/1998 | Ran | 6,269,413 B1 | 7/2001 | Sherlock |
| 5,784,358 A | 7/1998 | Smith et al. | 6,278,708 B1 | 8/2001 | Von Hammerstein et al. |
| 5,790,545 A | 8/1998 | Holt et al. | 6,286,011 B1 * | 9/2001 | Velamuri et al. ......... 707/104.1 |
| 5,790,840 A | 8/1998 | Bulka et al. | 6,289,002 B1 | 9/2001 | Henson et al. |
| 5,812,525 A | 9/1998 | Teraslinna | 6,301,612 B1 | 10/2001 | Selitrennikoff et al. |
| 5,818,842 A | 10/1998 | Burwell et al. ............. 370/397 | 6,307,857 B1 | 10/2001 | Yokoyama et al. |
| 5,821,875 A | 10/1998 | Lee et al. | 6,308,220 B1 | 10/2001 | Mathur ....................... 709/238 |
| 5,822,300 A | 10/1998 | Johnson et al. | 6,311,204 B1 | 10/2001 | Mills et al. |
| 5,825,748 A | 10/1998 | Barkey et al. | 6,324,181 B1 | 11/2001 | Wong et al. ................. 370/403 |
| 5,828,475 A | 10/1998 | Bennett et al. | 6,330,236 B1 | 12/2001 | Ofek et al. .................. 370/369 |
| 5,828,903 A | 10/1998 | Sethuram et al. | 6,333,932 B1 | 12/2001 | Kobayasi et al. |
| 5,835,748 A | 11/1998 | Orenstein et al. | 6,334,153 B2 | 12/2001 | Boucher et al. |
| 5,835,752 A | 11/1998 | Chiang et al. | 6,335,935 B2 | 1/2002 | Kadambi et al. |
| 5,850,386 A | 12/1998 | Anderson et al. | 6,343,324 B1 | 1/2002 | Hubis et al. |
| 5,875,343 A | 2/1999 | Binford et al. | 6,353,612 B1 | 3/2002 | Zhu et al. |
| 5,881,296 A | 3/1999 | Williams et al. | 6,370,605 B1 | 4/2002 | Chong |
| 5,892,604 A | 4/1999 | Yamanaka et al. | 6,389,479 B1 | 5/2002 | Boucher et al. |
| 5,892,969 A | 4/1999 | Young | 6,393,487 B2 | 5/2002 | Boucher et al. |
| 5,894,560 A | 4/1999 | Carmichael et al. | 6,397,360 B1 | 5/2002 | Bruns |
| 5,905,905 A | 5/1999 | Dailey et al. | 6,401,128 B1 | 6/2002 | Stai et al. |
| 5,917,723 A | 6/1999 | Binford | 6,404,749 B1 * | 6/2002 | Falk ............................ 370/325 |
| 5,925,119 A | 7/1999 | Maroney | 6,411,599 B1 | 6/2002 | Blanc et al. ................. 370/219 |
| 5,936,442 A | 8/1999 | Liu et al. | 6,411,627 B1 | 6/2002 | Hullett et al. |
| 5,937,169 A | 8/1999 | Connery et al. | 6,418,477 B1 | 7/2002 | Verma |
| 5,954,796 A | 9/1999 | McCarty et al. | 6,421,342 B1 | 7/2002 | Schwartz et al. |
| 5,968,143 A | 10/1999 | Chisholm et al. | 6,421,711 B1 * | 7/2002 | Blumenau et al. ........... 709/213 |

| Patent | Date | Inventor |
|---|---|---|
| 6,424,658 B1 | 7/2002 | Mathur ................. 370/429 |
| 6,427,171 B1 | 7/2002 | Craft et al. |
| 6,427,173 B1 | 7/2002 | Boucher et al. |
| 6,434,620 B1 | 8/2002 | Boucher et al. |
| 6,434,630 B1 | 8/2002 | Micalizzi, Jr. et al. |
| 6,438,628 B1 | 8/2002 | Messerly et al. |
| 6,449,274 B1 | 9/2002 | Holden et al. ............ 370/392 |
| 6,452,915 B1 | 9/2002 | Jorgensen |
| 6,457,090 B1 | 9/2002 | Young |
| 6,463,032 B1 | 10/2002 | Lau et al. |
| 6,467,008 B1 | 10/2002 | Gentry ................. 710/261 |
| 6,470,026 B1 | 10/2002 | Pearson et al. |
| 6,470,173 B1 | 10/2002 | Okada et al. |
| 6,470,415 B1 | 10/2002 | Starr et al. |
| 6,480,500 B1 | 11/2002 | Erimli et al. |
| 6,502,189 B1 | 12/2002 | Westby |
| 6,504,846 B1 | 1/2003 | Yu et al. |
| 6,509,988 B1 | 1/2003 | Saito |
| 6,532,212 B1 | 3/2003 | Soloway et al. |
| 6,546,010 B1 | 4/2003 | Merchant et al. |
| 6,563,796 B1 | 5/2003 | Saito |
| 6,564,271 B2 | 5/2003 | Micalizzi et al. |
| 6,570,850 B1 | 5/2003 | Gutierrez et al. |
| 6,570,853 B1 | 5/2003 | Johnson et al. |
| 6,591,302 B2 | 7/2003 | Boucher et al. |
| 6,594,231 B1 | 7/2003 | Byham et al. |
| 6,597,691 B1 | 7/2003 | Anderson et al. ........ 370/360 |
| 6,597,777 B1 | 7/2003 | Ho |
| 6,606,690 B2 | 8/2003 | Padovano |
| 6,614,796 B1 | 9/2003 | Black et al. |
| 6,622,206 B1 | 9/2003 | Kanamaru et al. |
| 6,629,161 B2 | 9/2003 | Matsuki et al. |
| 6,643,298 B1 * | 11/2003 | Brunheroto et al. ...... 370/537 |
| 6,657,962 B1 | 12/2003 | Barri et al. |
| 6,684,209 B1 | 1/2004 | Ito et al. |
| 6,697,359 B1 | 2/2004 | George ................. 370/357 |
| 6,697,368 B2 | 2/2004 | Chang et al. |
| 6,697,914 B1 | 2/2004 | Hospodor et al. |
| 6,721,799 B1 | 4/2004 | Slivkoff |
| 6,738,381 B1 | 5/2004 | Agnevik et al. |
| 6,744,772 B1 | 6/2004 | Eneboe et al. |
| 6,760,302 B1 | 7/2004 | Ellinas et al. |
| 6,765,871 B1 | 7/2004 | Knobel et al. |
| 6,775,693 B1 | 8/2004 | Adams |
| 6,779,083 B2 | 8/2004 | Ito et al. |
| 6,785,241 B1 | 8/2004 | Lu et al. |
| 6,807,181 B1 | 10/2004 | Weschler |
| 6,810,440 B2 | 10/2004 | Micalizzi, Jr. et al. |
| 6,810,442 B1 | 10/2004 | Lin |
| 6,816,492 B1 | 11/2004 | Turner et al. |
| 6,816,750 B1 | 11/2004 | Klaas |
| 6,859,435 B1 | 2/2005 | Lee et al. |
| 6,865,157 B1 | 3/2005 | Scott et al. |
| 6,886,141 B1 | 4/2005 | Kunz et al. |
| 6,888,831 B1 | 5/2005 | Hospodor et al. |
| 6,901,072 B1 | 5/2005 | Wong |
| 6,922,408 B2 | 7/2005 | Bloch et al. |
| 6,928,470 B1 | 8/2005 | Hamlin |
| 6,934,799 B2 | 8/2005 | Acharya et al. |
| 6,941,357 B2 | 9/2005 | Nguyen et al. |
| 6,941,482 B2 | 9/2005 | Strong |
| 6,947,393 B2 | 9/2005 | Hooper, III |
| 6,952,659 B2 | 10/2005 | King et al. |
| 6,968,463 B2 | 11/2005 | Pherson et al. |
| 6,975,627 B1 | 12/2005 | Parry et al. |
| 6,987,768 B1 | 1/2006 | Kojima et al. |
| 6,988,130 B2 | 1/2006 | Blumenau et al. |
| 6,988,149 B2 | 1/2006 | Odenwald |
| 7,000,025 B1 | 2/2006 | Wilson |
| 7,002,926 B1 | 2/2006 | Eneboe et al. |
| 7,024,410 B2 | 4/2006 | Ito et al. |
| 7,031,615 B2 | 4/2006 | Genrile |
| 7,039,070 B2 | 5/2006 | Kawakatsu |
| 7,039,870 B2 | 5/2006 | Takaoka et al. |
| 7,047,326 B2 | 5/2006 | Crosbie et al. |
| 7,050,392 B2 | 5/2006 | Valdevit |
| 7,051,182 B2 | 5/2006 | Blumenau et al. |
| 7,055,068 B2 | 5/2006 | Riedl |
| 7,061,862 B2 | 6/2006 | Horiguchi et al. |
| 7,092,374 B1 | 8/2006 | Gubbi |
| 7,110,394 B1 | 9/2006 | Chamdani et al. |
| 7,120,728 B2 | 10/2006 | Krakirian et al. |
| 7,123,306 B1 | 10/2006 | Goto et al. |
| 7,124,169 B2 | 10/2006 | Shimozono et al. |
| 7,150,021 B1 | 12/2006 | Vajjhala et al. |
| 7,151,778 B2 | 12/2006 | Zhu et al. |
| 7,171,050 B2 | 1/2007 | Kim |
| 7,185,062 B2 | 2/2007 | Lolayekar et al. |
| 7,187,688 B2 | 3/2007 | Garmire et al. |
| 7,188,364 B2 | 3/2007 | Volpano |
| 7,190,667 B2 | 3/2007 | Susnow et al. |
| 7,194,538 B1 | 3/2007 | Rabe et al. |
| 7,200,108 B2 | 4/2007 | Beer et al. |
| 7,200,610 B1 | 4/2007 | Prawdiuk et al. |
| 7,209,478 B2 | 4/2007 | Rojas et al. |
| 7,215,680 B2 | 5/2007 | Mullendore et al. |
| 7,221,650 B1 | 5/2007 | Cooper et al. |
| 7,230,929 B2 | 6/2007 | Betker et al. |
| 7,233,570 B2 | 6/2007 | Gregg |
| 7,233,985 B2 | 6/2007 | Hahn et al. |
| 7,245,613 B1 | 7/2007 | Winkles et al. |
| 7,245,627 B2 | 7/2007 | Goldenberg et al. |
| 7,248,580 B2 | 7/2007 | George et al. |
| 7,263,593 B2 | 8/2007 | Honda et al. |
| 7,266,286 B2 | 9/2007 | Tanizawa et al. |
| 7,269,168 B2 | 9/2007 | Roy et al. |
| 7,277,431 B2 | 10/2007 | Walter et al. |
| 7,287,063 B2 | 10/2007 | Baldwin et al. |
| 7,292,593 B1 | 11/2007 | Winkles et al. |
| 7,315,511 B2 | 1/2008 | Morita et al. |
| 7,327,680 B1 | 2/2008 | Kloth |
| 7,352,740 B2 | 4/2008 | Hammons et al. |
| 7,397,788 B2 | 7/2008 | Mies et al. |
| 7,406,034 B1 | 7/2008 | Cometto et al. |
| 7,443,794 B2 | 10/2008 | George et al. |
| 7,460,534 B1 * | 12/2008 | Bellenger ............... 370/392 |
| 7,466,700 B2 * | 12/2008 | Dropps et al. ........... 370/389 |
| 2001/0011357 A1 | 8/2001 | Mori |
| 2001/0022823 A1 | 9/2001 | Renaud |
| 2001/0033552 A1 | 10/2001 | Barrack et al. |
| 2001/0038628 A1 | 11/2001 | Ofek et al. .............. 370/392 |
| 2001/0043564 A1 | 11/2001 | Bloch et al. |
| 2001/0047460 A1 | 11/2001 | Kobayashi et al. |
| 2002/0016838 A1 | 2/2002 | Geluc et al. |
| 2002/0034178 A1 | 3/2002 | Schmidt et al. |
| 2002/0071387 A1 | 6/2002 | Horiguchi et al. |
| 2002/0103913 A1 | 8/2002 | Tawil et al. |
| 2002/0104039 A1 | 8/2002 | DeRolf et al. |
| 2002/0118692 A1 | 8/2002 | Oberman et al. |
| 2002/0122428 A1 | 9/2002 | Fan et al. |
| 2002/0124124 A1 | 9/2002 | Matsumoto et al. |
| 2002/0147560 A1 | 10/2002 | Devins et al. |
| 2002/0147843 A1 | 10/2002 | Rao |
| 2002/0156918 A1 | 10/2002 | Valdevit et al. |
| 2002/0159385 A1 | 10/2002 | Susnow et al. |
| 2002/0172195 A1 | 11/2002 | Pekkala et al. |
| 2002/0174197 A1 | 11/2002 | Schimke et al. |
| 2002/0191602 A1 | 12/2002 | Woodring et al. |
| 2002/0194294 A1 | 12/2002 | Blumenau et al. |
| 2002/0196773 A1 | 12/2002 | Berman |
| 2003/0002503 A1 | 1/2003 | Brewer et al. |
| 2003/0002516 A1 | 1/2003 | Boock et al. |
| 2003/0016683 A1 | 1/2003 | George et al. |
| 2003/0021239 A1 | 1/2003 | Mullendore et al. |
| 2003/0026267 A1 | 2/2003 | Oberman et al. |
| 2003/0026287 A1 | 2/2003 | Mullendore et al. |

| | | | |
|---|---|---|---|
| 2003/0033487 A1 | 2/2003 | Pfister et al. | |
| 2003/0035433 A1 | 2/2003 | Craddock et al. | |
| 2003/0046396 A1* | 3/2003 | Richter et al. | 709/226 |
| 2003/0056000 A1 | 3/2003 | Mullendore et al. | |
| 2003/0063567 A1 | 4/2003 | Dehart | |
| 2003/0072316 A1 | 4/2003 | Niu et al. | |
| 2003/0076788 A1 | 4/2003 | Grabauskas et al. | |
| 2003/0079019 A1 | 4/2003 | Lolayekar et al. | |
| 2003/0084219 A1 | 5/2003 | Yao et al. | |
| 2003/0086377 A1* | 5/2003 | Berman | 370/352 |
| 2003/0091062 A1 | 5/2003 | Lay et al. | |
| 2003/0093607 A1 | 5/2003 | Main et al. | |
| 2003/0103451 A1 | 6/2003 | Lutgen et al. | |
| 2003/0112819 A1 | 6/2003 | Kofoed et al. | |
| 2003/0115355 A1 | 6/2003 | Cometto et al. | |
| 2003/0117961 A1 | 6/2003 | Chuah et al. | |
| 2003/0118053 A1 | 6/2003 | Edsall et al. | |
| 2003/0120743 A1 | 6/2003 | Coatney et al. | |
| 2003/0120791 A1 | 6/2003 | Weber et al. | |
| 2003/0120983 A1 | 6/2003 | Vieregge et al. | |
| 2003/0126223 A1 | 7/2003 | Jenne et al. | |
| 2003/0126242 A1 | 7/2003 | Chang | |
| 2003/0126320 A1 | 7/2003 | Liu et al. | |
| 2003/0131105 A1 | 7/2003 | Czeiger et al. | |
| 2003/0137941 A1 | 7/2003 | Kaushik et al. | |
| 2003/0139900 A1 | 7/2003 | Robison | |
| 2003/0172149 A1 | 9/2003 | Edsall et al. | |
| 2003/0172239 A1 | 9/2003 | Swank | |
| 2003/0174652 A1 | 9/2003 | Ebata | |
| 2003/0174721 A1 | 9/2003 | Black et al. | |
| 2003/0174789 A1 | 9/2003 | Waschura et al. | |
| 2003/0179709 A1 | 9/2003 | Huff | |
| 2003/0179748 A1 | 9/2003 | George et al. | 370/389 |
| 2003/0179755 A1 | 9/2003 | Fraser | |
| 2003/0189930 A1 | 10/2003 | Terrell et al. | |
| 2003/0189935 A1 | 10/2003 | Warden et al. | |
| 2003/0191857 A1 | 10/2003 | Terell et al. | |
| 2003/0195983 A1 | 10/2003 | Krause | |
| 2003/0198238 A1 | 10/2003 | Westby | |
| 2003/0200315 A1 | 10/2003 | Goldenberg et al. | |
| 2003/0229808 A1 | 12/2003 | Heintz et al. | |
| 2003/0236953 A1 | 12/2003 | Grieff et al. | |
| 2004/0013088 A1 | 1/2004 | Gregg | |
| 2004/0013092 A1 | 1/2004 | Betker et al. | |
| 2004/0013113 A1* | 1/2004 | Singh et al. | 370/389 |
| 2004/0013125 A1 | 1/2004 | Betker et al. | |
| 2004/0015638 A1 | 1/2004 | Forbes | |
| 2004/0024831 A1 | 2/2004 | Yang et al. | |
| 2004/0028038 A1 | 2/2004 | Anderson et al. | |
| 2004/0054776 A1 | 3/2004 | Klotz et al. | |
| 2004/0054866 A1 | 3/2004 | Blumenau et al. | |
| 2004/0057389 A1 | 3/2004 | Klotz et al. | |
| 2004/0064664 A1 | 4/2004 | Gil | |
| 2004/0081186 A1 | 4/2004 | Warren et al. | |
| 2004/0081196 A1 | 4/2004 | Elliott | |
| 2004/0081394 A1 | 4/2004 | Biren et al. | |
| 2004/0085955 A1 | 5/2004 | Walter et al. | |
| 2004/0085974 A1 | 5/2004 | Mies et al. | |
| 2004/0085994 A1 | 5/2004 | Warren et al. | |
| 2004/0092278 A1 | 5/2004 | Diepstraten et al. | |
| 2004/0100944 A1 | 5/2004 | Richmond et al. | |
| 2004/0109418 A1 | 6/2004 | Fedorkow et al. | |
| 2004/0123181 A1 | 6/2004 | Moon et al. | |
| 2004/0125799 A1* | 7/2004 | Buer | 370/389 |
| 2004/0141518 A1 | 7/2004 | Milligan et al. | |
| 2004/0141521 A1 | 7/2004 | George | 370/463 |
| 2004/0151188 A1 | 8/2004 | Maveli et al. | |
| 2004/0153526 A1 | 8/2004 | Haun et al. | |
| 2004/0153566 A1 | 8/2004 | Lalsangi et al. | |
| 2004/0153914 A1 | 8/2004 | El-Batal | |
| 2004/0202189 A1 | 10/2004 | Arndt et al. | |
| 2004/0208201 A1 | 10/2004 | Otake | |
| 2004/0267982 A1 | 12/2004 | Jackson et al. | |
| 2005/0018673 A1* | 1/2005 | Dropps et al. | 370/389 |
| 2005/0023656 A1 | 2/2005 | Leedy | |
| 2005/0036485 A1 | 2/2005 | Eilers et al. | |
| 2005/0036499 A1 | 2/2005 | Dutt et al. | |
| 2005/0036763 A1 | 2/2005 | Kato et al. | |
| 2005/0047334 A1 | 3/2005 | Paul et al. | |
| 2005/0073956 A1 | 4/2005 | Moores et al. | |
| 2005/0076113 A1 | 4/2005 | Klotz et al. | |
| 2005/0088969 A1 | 4/2005 | Carlsen et al. | |
| 2005/0108444 A1 | 5/2005 | Flauaus et al. | |
| 2005/0111845 A1 | 5/2005 | Nelson et al. | |
| 2005/0117522 A1 | 6/2005 | Basavaiah et al. | |
| 2005/0177641 A1 | 8/2005 | Yamagami | |
| 2005/0198523 A1 | 9/2005 | Shanbhag et al. | |
| 2006/0013248 A1 | 1/2006 | Mujeeb et al. | |
| 2006/0034192 A1 | 2/2006 | Hurley et al. | |
| 2006/0034302 A1 | 2/2006 | Peterson | |
| 2006/0047852 A1 | 3/2006 | Shah et al. | |
| 2006/0074927 A1 | 4/2006 | Sullivan et al. | |
| 2006/0107260 A1 | 5/2006 | Motta | |
| 2006/0143300 A1 | 6/2006 | See et al. | |
| 2006/0184711 A1 | 8/2006 | Pettey | |
| 2006/0203725 A1 | 9/2006 | Paul et al. | |
| 2006/0274744 A1 | 12/2006 | Nagai et al. | |
| 2007/0206502 A1 | 9/2007 | Martin et al. | |

FOREIGN PATENT DOCUMENTS

| | | |
|---|---|---|
| EP | 0649098 | 9/1994 |
| EP | 0738978 | 10/1996 |
| EP | 0856969 | 1/1998 |
| EP | 1059588 | 12/2000 |
| WO | WO 95/06286 | 3/1995 |
| WO | WO-98/36537 | 8/1998 |
| WO | WO 0058843 | 10/2000 |
| WO | WO-01/95566 | 12/2001 |
| WO | WO03/088050 | 10/2003 |

OTHER PUBLICATIONS

Banks, David C., et al., "Link Trunking and Measuring Link Latency in Fibre Channel Fabric", U.S. Appl. No. 60/286,046, 1-52.

Curtis, A. R., "Design Considerations for 10-Gbit Fibre Channel", Curtis A. Ridgeway, *Distinguished I/O Architect, Storage and Computing ASIC's Division, LSI Logic Corp.*

Malavalli, Kumar, "High Speed Fibre Channel Switching Fabric Devices", *Proceedings of the SPIE, SPIE*, Bellingham, VA, USA vol. 1577,, XP000562869, ISSN: 0277-786X,(Sep. 4, 1991),216-226.

Ridgeway, Curt, "0GFC-40GFC using 4-lane XAUI's", *LSI Logic Presentation—T11/03-069v0.*

Clark, Tom, "Zoning for Fibre Channel Fabrics", Vixel Corporation Paper—XP002185194., (Aug. 1999), pp. 1-6.

Malavalli, Kumar, et al., "Distributed Computing with fibre channel fabric", Proc of the Computer Soc. Int'l Conf., Los Alamitos, IEEE Comp Soc. Press., vol. Conf. 37, XP000340745, (Feb. 24, 1992), pp. 269-274.

Martin, Charles R., "Fabric Interconnection of fibre channel standard nodes", Proceedings of the SPIE, (Sep. 8, 1992), pp. 65-71.

Yoshida, Hu, "LUN Security Considerations for Storage Area Networks," Hitachi Data Systems Paper—XP 002185193 (1999), pp. 1-7.

Claudio DeSanti, "Virtual Fabrics Switch Support" ; VF Switch Support, T11/04-395v2. Sep. 2004, pp. 1-15.

Pelissier et al, "Inter-Fabric Routing", dated Jul. 30, 2004, Inter Fabric Routing (04-520v0); pp. 1-31.

DeSanti et al, "Virtual Fabrics"; Virtual Fabrics, T11/03-352v0, May 2003; pp. 1-4.

Martin et al , "Virtual Channel Architecture" , Presentation by Brocade to T11/03-369V0 dated Jun. 2, 2003.

Malavalli, et al., "Fibre Channel Framing and Signaling (FC-FS) REV 1.10", *NCITS working draft proposed American National Standard for Information Technology*, (Jan. 25, 2001).

"Office Action from USPTO dated Aug. 20, 2007 for U.S. Appl. No. 10/302,149".

"Office Action from USPTO dated Jan. 19, 2006 for U.S. Appl. No. 10/212,425".
"Office Action from USPTO dated May 21, 2007 for U.S. Appl. No. 10/212,425".
"Office Action from USPTO dated Oct. 18, 2006 for U.S. Appl. No. 10/241,153".
"Office Action from USPTO dated Apr. 3, 2007 for U.S. Appl. No. 10/241,153".
"Office Action from USPTO dated Nov. 16, 2007 for U.S. Appl. No. 10/241,153".
"Office Action from USPTO dated Nov. 15, 2006 for U.S. Appl. No. 10/263,858".
"Notice of Allowance from USPTO dated Dec. 21, 2007 for U.S. Appl. No. 10/961,463".
"Notice of Allowance from USPTO dated Dec. 20, 2007 for U.S. Appl. No. 10/889,337".
"Office Action from USPTO dated Sep. 6, 2007 for U.S. Appl. No. 10/889,337".
"Office Action from USPTO dated Dec. 7, 2007 for U.S. Appl. No. 10/961,463".
"Office Action from USPTO dated Jul. 3, 2007 for U.S. Appl. No. 10/664,548".
"Office Action from USPTO dated Sep. 20, 2007 for U.S. Appl. No. 10/798,527".
"Office Action from USPTO dated Sep. 20, 2007 for U.S. Appl. No. 10/889,267".
"Office Action from USPTO dated Aug. 31, 2007 for U.S. Appl. No. 10/889,635".
"Office Action from USPTO dated Mar. 21, 2006 for U.S. Appl. No. 10/889,588".
"Office Action from USPTO dated Sep. 10, 2007 for U.S. Appl. No. 10/889,255".
"Office Action from USPTO dated Sep. 4, 2007 for U.S. Appl. No. 10/889,551".
"Office Action from USPTO dated Sep. 20, 2007 for U.S. Appl. No. 10/889,259".
"Office Action from USPTO dated Sep. 19, 2007 for U.S. Appl. No. 10/894,492".
"Office Action from USPTO dated Oct. 4, 2007 for U.S. Appl. No. 10/894,627".
"Office Action from USPTO dated Oct. 25, 2007 for U.S. Appl. No. 10/894,491".
"Office Action from USPTO dated Oct. 23, 2007 for U.S. Appl. No. 10/894,597".
"Office Action from USPTO dated Oct. 25, 2007 for U.S. Appl. No. 10/894,579".
"Office Action from USPTO dated Oct. 11, 2007 for U.S. Appl. No. 10/894,629".
"Office Action from USPTO dated Oct. 25, 2007 for U.S. Appl. No. 10/894,536".
"Office Action from USPTO dated Nov. 13, 2007 for U.S. Appl. No. 10/894,586".
"Office Action from USPTO dated Oct. 17, 2007 for U.S. Appl. No. 10/894,917".
"Office Action from USPTO dated Jun. 28, 2007 for U.S. Appl. No. 10/894,529".
"Office Action from USPTO dated Apr. 6, 2007 for U.S. Appl. No. 10/956,718".
"Office Action from USPTO dated Oct. 3, 2007 for U.S. Appl. No. 10/956,717".
"Office Action from USPTO dated Jun. 1, 2007 for U.S. Appl. No. 10/961,463".
"Office Action from USPTO dated Jul. 11, 2007 for U.S. Appl. No. 10/263,858".
"Office Action from USPTO dated Jan. 19, 2007 for U.S. Appl. No. 10/302,149".
"Office Action from USPTO dated Dec. 5, 2006 for U.S. Appl. No. 10/212,425".
"Notice of Allowance from USPTO dated Jan. 8, 2008 for U.S. Appl. No. 10/889,551".
"Office Action from USPTO dated Jan. 9, 2008 for U.S. Appl. No. 10/798,468".
"Notice of Allowance from USPTO dated Jan. 11, 2008 for U.S. Appl. No. 10/664,548".
"Notice of Allowance from USPTO dated Jan. 10, 2008 for U.S. Appl. No. 10/263,858".
"Notice of Allowance from USPTO dated Feb. 8, 2008 for U.S. Appl. No. 10/894,529".
"Office Action from USPTO dated Feb. 12, 2008 for U.S. Appl. No. 11/057,912".
"Office Action from USPTO dated Mar. 5, 2008 for U.S. Appl. No. 10/889,259".
"Office Action from USPTO dated Mar. 7, 2008 for U.S. Appl. No. 10/894,629".
"Office Action from USPTO dated Mar. 20, 2008 for U.S. Appl. No. 10/894,732".
"Notice of Allowance from USPTO dated Apr. 10, 2008 for U.S. Appl. No. 10/241,153".
"Office Action from USPTO dated Apr. 11, 2008 for U.S. Appl. No. 10/894,595".
"Office Action from USPTO dated Apr. 14, 2008 for U.S. Appl. No. 10/894,627".
"Office Action from USPTO dated Apr. 17, 2008 for U.S. Appl. No. 10/894,689".
"Notice of Allowance from USPTO dated Apr. 18, 2008 for U.S. Appl. No. 10/894,597".
"Final Office Action from USPTO dated Apr. 23, 2008 for U.S. Appl. No. 10/889,255".
"Final Office Action from USPTO dated Apr. 25, 2008 for U.S. Appl. No. 10/894,579".
"Final Office Action from USPTO dated Apr. 1, 2008 for U.S. Appl. No. 10/956,717".
"Office Action from USPTO dated Apr. 3, 2008 for U.S. Appl. No. 10/894,587".
"Office Action from USPTO dated Apr. 4, 2008 for U.S. Appl. No. 10/957,465".
"Office Action from USPTO dated Jun. 27, 2008 for U.S. Appl. No. 10/894,726".
"Final Office Action from USPTO dated Jul. 9, 2008 for U.S. Appl. No. 10/894,917".
"Notice of Allowance from USPTO dated Jul. 9, 2008 for U.S. Appl. No. 10/894,629".
"Notice of Allowance from USPTO dated Jul. 9, 2008 for U.S. Appl. No. 10/894,579".
"Notice of Allowance from USPTO dated Jul. 17, 2008 for U.S. Appl. No. 10/894,536".
"Office Action from USPTO dated Jul. 25, 2008 for U.S. Appl. No. 10/894,827".
"Office Action from State Intellectual Property Office (SIPO) of China for Chinese application 200580032889.0".
"Final Office Action from USPTO Dated Aug. 4, 2008 for U.S. Appl. No. 10/894,732".
"Notice of Allowance from USPTO dated Aug. 18, 2008 for U.S. Appl. No. 10/889,259".
"Final Office Action from USPTO dated Aug. 20, 2008 for U.S. Appl. No. 10/798,468".
"Final Office Action from USPTO dated Jun. 5, 2008 for U.S. Appl. No. 10/889,267".
"Final Office Action from USPTO dated Jun. 10, 2008 for U.S. Appl. No. 10/894,586".
"Office Action from USPTO dated Jun. 25, 2008 for U.S. Appl. No. 10/895,175".
"Notice of Allowance from USPTO dated Jun. 25, 2008 for U.S. Appl. No. 10/894,491".
"Notice of Allowance from USPTO dated Jun. 27, 2008 for U.S. Appl. No. 10/956,717".
"Office Action from USPTO dated Jun. 26, 2008 for U.S. Appl. No. 10/894,547".
"Office Action from USPTO dated Sep. 23, 2008 for U.S. Appl. No. 12/031,585".
"Notice of Allowance from the USPTO dated Sep. 29, 2008 for U.S. Appl. No. 10/889,267".
"Final Office Action from USPTO dated Oct. 8, 2008 for U.S. Appl. No. 11/057,912".

"Non-Final Office Action from USPTO dated Oct. 10, 2008 for U.S. Appl. No. 10/894,627".
"Notice of Allowance from USPTO dated Oct. 8, 2008 for U.S. Appl. No. 10/889,255".
"Notice of Allowance from USPTO dated Oct. 8, 2008 for U.S. Appl. No. 10/798,527".
"Notice of Allowance from USPTO dated Oct. 15, 2008 for U.S. Appl. No. 10/894,492".
"Final Office Action from USPTO dated Oct. 17, 2008 for U.S. Appl. No. 10/894,595".
"Final Office Action from USPTO dated Nov. 13, 2008 for U.S. Appl. No. 10/894,587".
"Office Action from USPTO dated Nov. 13, 2008 for U.S. Appl. No. 10/894,917".
"Office Action from USPTO dated Nov. 26, 2008 for U.S. Appl. No. 10/956,502".
"Office Action from USPTO dated Nov. 26, 2008 for U.S. Appl. No. 10/894,547".
"Final Office Action from USPTO dated Dec. 24, 2008 for U.S. Appl. No. 10/894,726".
"Office Action from USPTO dated Dec. 23, 2008 for U.S. Appl. No. 10/798,468".
"Notice of Allowance from USPTO dated Dec. 30, 2008 for U.S. Appl. No. 11/037,922".
"Final Office Action from USPTO dated Jan. 21, 2009 for U.S. Appl. No. 10/894,827".
"Office Action from USPTO dated Jan. 17, 2009 for U.S. Appl. No. 10/894,586".
"Final Office Action from USPTO dated Jan. 26, 2009 for U.S. Appl. No. 10/895,175".
"Notice of Allowance from USPTO dated Feb. 10, 2009 for U.S. Appl. No. 10/894,595".
"Office Action from USPTO dated Feb. 17, 2009 for U.S. Appl. No. 10/894,732".
"Notice of Allowance from USPTO dated Feb. 25, 2009 for U.S. Appl. No. 10/894,827".
"Notice of Allowance from USPTO dated Feb. 27, 2009 for U.S. Appl. No. 10/895,175".
International Preliminary Report on Patentability dated Apr. 3, 2007, for International patent application No. PCT/US2005/034844.
International Preliminary Report on Patentability dated Apr. 3, 2007, for International patent application No. PCT/US2005/034758.
International Preliminary Report on Patentability dated Apr. 11, 2007, for International patent application No. PCT/US2005/034845.
International Preliminary Report on Patentability dated Apr. 3, 2007, for International patent application No. PCT/US2005/035064.
International Preliminary Report on Patentability dated Jul. 24, 2007, for International patent application No. PCT/US2005/42528.
Naik, D. "Inside Windows Storage:Server Storage Technologies for Windows 2000, Windows Server 2003 and Beyond", *Addison-Wesley, US, Chapter 5*, XP-002381152, (Jul. 15, 2003),137-173.
"Deliver Server-Free Backup", *Pathlight & Computer Associates*, White Paper of Apr. 2000, Ithaca, New York, XP-002381153,1-8.
Brown, Douglas W., "A State-Machine Synthesizer", *18th Design Automation Conference*, (1981),301-305.
"Final Office Action from USPTO dated Apr. 29, 2008 for U.S. Appl. No. 10/894,491".
"Final Office Action from USPTO dated May 21, 2008 for U.S. Appl. No. 10/889,635".
"Office Action from USPTO dated May 2, 2008 for U.S. Appl. No. 11/037,922".
"Final Office Action from USPTO dated May 12, 2008 for U.S. Appl. No. 10/894,492".
"Office Action from USPTO dated May 14, 2008 for U.S. Appl. No. 10/956,502".
"Office Action from USPTO dated May 15, 2008 for U.S. Appl. No. 10/798,527".

\* cited by examiner

*Primary Examiner*—Aung S Moe
*Assistant Examiner*—Christopher P Grey
(74) *Attorney, Agent, or Firm*—Klein, O'Neill & Singh, LLP

(57) ABSTRACT

A method and system for routing fiber channel frames using a fiber channel switch element is provided. The switch element includes, a hashing module whose output is used to select the column from a look up table to route frames. The method includes, indexing a look up table using domain, area, virtual storage area network identifier, a hashing module output and/or AL_PA values; selecting a column from the look up table based on a column select signal; and routing a frame if a route is valid. The hashing module takes a fiber channel header to generate a pseudo random value used for selecting a column from the look up table. The hashing module uses same field values in an exchange to generate the pseudo random value. A hash function is used on a frame's OX_ID, D_ID, S_ID, and/or RX_ID to route fiber channel frames.

16 Claims, 14 Drawing Sheets

Load Balancing

METHOD AND SYSTEM FOR PROGRAMMABLE DATA DEPENDANT NETWORK ROUTING

CROSS REFERENCE TO RELATED APPLICATIONS

This application claims priority under 35 U.S.C.§ 119(e)(1) to the following provisional patent applications:

Filed on Sep. 19, 2003, Ser. No. 60/503,812, entitled "Method and System for Fibre Channel Switches";

Filed on Jan. 21, 2004, Ser. No. 60/537,933 entitled "Method And System For Routing And Filtering Network Data Packets In Fibre Channel Systems";

Filed on Jul. 21, 2003, Ser. No. 60/488,757, entitled "Method and System for Selecting Virtual Lanes in Fibre Channel Switches";

Filed on Dec. 29, 2003, Ser. No. 60/532,965, entitled "Programmable Pseudo Virtual Lanes for Fibre Channel Systems";

Filed on Sep. 19, 2003, Ser. No. 60/504,038, entitled-"Method and System for Reducing Latency and Congestion in Fibre Channel Switches;

Filed on Aug. 14, 2003, Ser. No. 60/495,212, entitled "Method and System for Detecting Congestion and Over Subscription in a Fibre channel Network"

Filed on Aug. 14, 2003, Ser. No. 60/495,165, entitled "LUN, Based Hard Zoning in Fibre Channel Switches";

Filed on Sep. 19, 2003, Ser. No. 60/503,809, entitled "Multi Speed Cut Through Operation in Fibre Channel Switches";

Filed on Sep. 23, 2003, Ser. No. 60/505,381, entitled "Method and System for Improving bandwidth and reducing Idles in Fibre Channel Switches";

Filed on Sep. 23, 2003, Ser. No. 60/505,195, entitled "Method and System for Keeping a Fibre Channel Arbitrated Loop Open During Frame Gaps";

Filed on Mar. 30, 2004, Ser. No. 60/557,613, entitled "Method and System for Congestion Control based on Optimum-Bandwidth Allocation in a Fibre Channel Switch";

Filed on Sep. 23, 2003, Ser. No. 60/505,075, entitled "Method and System for Programmable Data Dependent Network Routing";

Filed on Sep. 19, 2003, Ser. No. 60/504,950, entitled "Method and System for Power Control of Fibre Channel Switches";

Filed on Dec. 29, 2003, Ser. No. 60/532,967, entitled "Method and System for Buffer to Buffer Credit recovery in Fibre Channel Systems Using Virtual and/or Pseudo Virtual Lane";

Filed on Dec. 29, 2003, Ser. No. 60/532,966, entitled "Method And System For Using Extended Fabric Features With Fibre Channel Switch Elements";

Filed on Mar. 4, 2004, Ser. No. 60/550,250, entitled "Method And System for Programmable Data Dependent Network Routing";

Filed on May 7, 2004, Ser. No. 60/569,436, entitled "Method And System For Congestion Control In A Fibre Channel Switch";

Filed on May 18, 2004, Ser. No. 60/572,197, entitled "Method and System for Configuring Fibre Channel Ports" and Filed on Dec. 29, 2003, Ser. No. 60/532,963 entitled "Method and System for Managing Traffic in Fibre Channel Switches".

BACKGROUND

The disclosure of the foregoing applications is incorporated herein by reference in their entirety.

1. Field of the Invention

The present invention relates to network systems, and more particularly, to programmable routing.

2. Background of the Invention

Fibre channel is a set of American National Standard Institute (ANSI) standards, which provide a serial transmission protocol for storage and network protocols such as HIPPI, SCSI, IP, ATM and others. Fibre channel provides an input/output interface to meet the requirements of both channel and network users.

Fibre channel supports three different topologies: point-to-point, arbitrated loop and fibre channel fabric. The point-to-point topology attaches two devices directly. The arbitrated loop topology attaches devices in a loop. The fibre channel fabric topology attaches host systems directly to a fabric, which are then connected to multiple devices. The fibre channel fabric topology allows several media types to be interconnected.

Fibre channel is a closed system that relies on multiple ports to exchange information on attributes and characteristics to determine if the ports can operate together. If the ports can work together, they define the criteria under which they communicate.

In fibre channel, a path is established between two nodes where the path's primary task is to transport data from one point to another at high speed with low latency, performing only simple error detection in hardware.

Fibre channel fabric devices include a node port or "N_Port" that manages fabric connections. The N_port establishes a connection to a fabric element (e.g., a switch) having a fabric port or F_port. Fabric elements include the intelligence to handle routing, error detection, recovery, and similar management functions.

A fibre channel switch is a multi-port device where each port manages a simple point-to-point connection between itself and its attached system. Each port can be attached to a server, peripheral, I/O subsystem, bridge, hub, router, or even another switch. A switch receives messages from one port and automatically routes it to another port. Multiple calls or data transfers happen concurrently through the multi-port fibre channel switch.

Fibre channel switches use memory buffers to hold frames received and sent across a network. Associated with these buffers are credits, which are the number of frames that a buffer can hold per fabric port.

Typically, fibre channel switches route frames to other switches based on frame destination address (D_ID). Usually for a receiving port and destination switch only one route is used. This can result in inefficient routing in modern fabrics because sometimes load balancing is needed. In addition, a preferred route may be useful for certain ports sending high priority data. Conventional routing techniques do not provide load balancing and preferred routing using D_ID fields.

Therefore, what is required is a system that is flexible and versatile that can perform intelligent routing based on Fabric needs.

SUMMARY OF THE PRESENT INVENTION

In one aspect of the present invention, a method for routing fibre channel frames using a fibre channel switch element is provided. The method includes, indexing a look up table using domain, area, virtual storage area network identifier, a hashing module output and/or AL_PA values; selecting a column from the look up table based on a column select signal; and routing a frame if a route is valid.

A hashing module output is used to select the column from the look up table. The hashing module takes a fibre channel header to generate a pseudo random value used for selecting a column from the look up table. The hashing module uses same field values in an exchange to generate the pseudo random value.

In yet another aspect of the present invention, a fibre channel switch element for routing fibre channel frames is provided. The switch element includes, a hashing module whose output is used to select the column from a look up table to route frames. The hashing module takes a fibre channel header and uses a hashing function to generate a pseudo random value used for selecting a column from the look up table. A hash function is used on a frame's OX_ID, D_ID, S_ID, and/or RX_ID to route fibre channel frames.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

Definitions:

The following definitions are provided as they are typically (but not exclusively) used in the fibre channel environment, implementing the various adaptive aspects of the present invention.

"D_ID": A 24-bit field in the Fibre Channel Frame header that contains the destination address for a frame.

"Domain": Bits 16-23 of a Fibre Channel Address, that usually correspond to a switch.

"Exchange": A grouping of Fibre Channel messages sent between two fibre Channel addresses. An Exchange includes at least one Sequence.

"E-Port": A fabric expansion port that attaches to another Interconnect port to create an Inter-Switch Link.

"F_Port": A port to which non-loop N_Ports are attached to a fabric and does not include FL_ports.

"Fibre Channel ANSI Standard": The standard (incorporated herein by reference in its entirety) describes the physical interface, transmission and signaling protocol of a high performance serial link for support of other high level protocols associated with IPI, SCSI, IP, ATM and others.

"FC-1": Fibre channel transmission protocol, which includes serial encoding, decoding and error control.

"FC-2": Fibre channel signaling protocol that includes frame structure and byte sequences.

"FC-3": Defines a set of fibre channel services that are common across plural ports of a node.

"FC-4": Provides mapping between lower levels of fibre channel, IPI and SCSI command sets, HIPPI data framing, IP and other upper level protocols.

"Fabric": The structure or organization of a group of switches, target and host devices (NL_Port, N_ports etc.).

"Fabric Topology": This is a topology where a device is directly attached to a fibre channel fabric that uses destination identifiers embedded in frame headers to route frames through a fibre channel fabric to a desired destination.

Port: A general reference to N. Sub.—Port or F.Sub.—Port.

"L_Port": A port that contains Arbitrated Loop functions associated with the Arbitrated Loop topology.

"N-Port": A direct fabric attached port.

"NL_Port": A L_Port that can perform the function of a N_Port.

"OX_ID": This is the originator Exchange identification field in the Fibre Channel header.

"Sequence": A set of one or more Fibre Channel frames sent as a message from one Fibre Channel address to another.

"S_ID": This is a 24-bit field in the Fibre Channel frame header that contains the source address for a frame.

"Switch": A fabric element conforming to the Fibre Channel Switch standards.

Fibre Channel System:

To facilitate an understanding of the preferred embodiment, the general architecture and operation of a fibre channel system will be described. The specific architecture and operation of the preferred embodiment will then be described with reference to the general architecture of the fibre channel system.

Figure 1A:
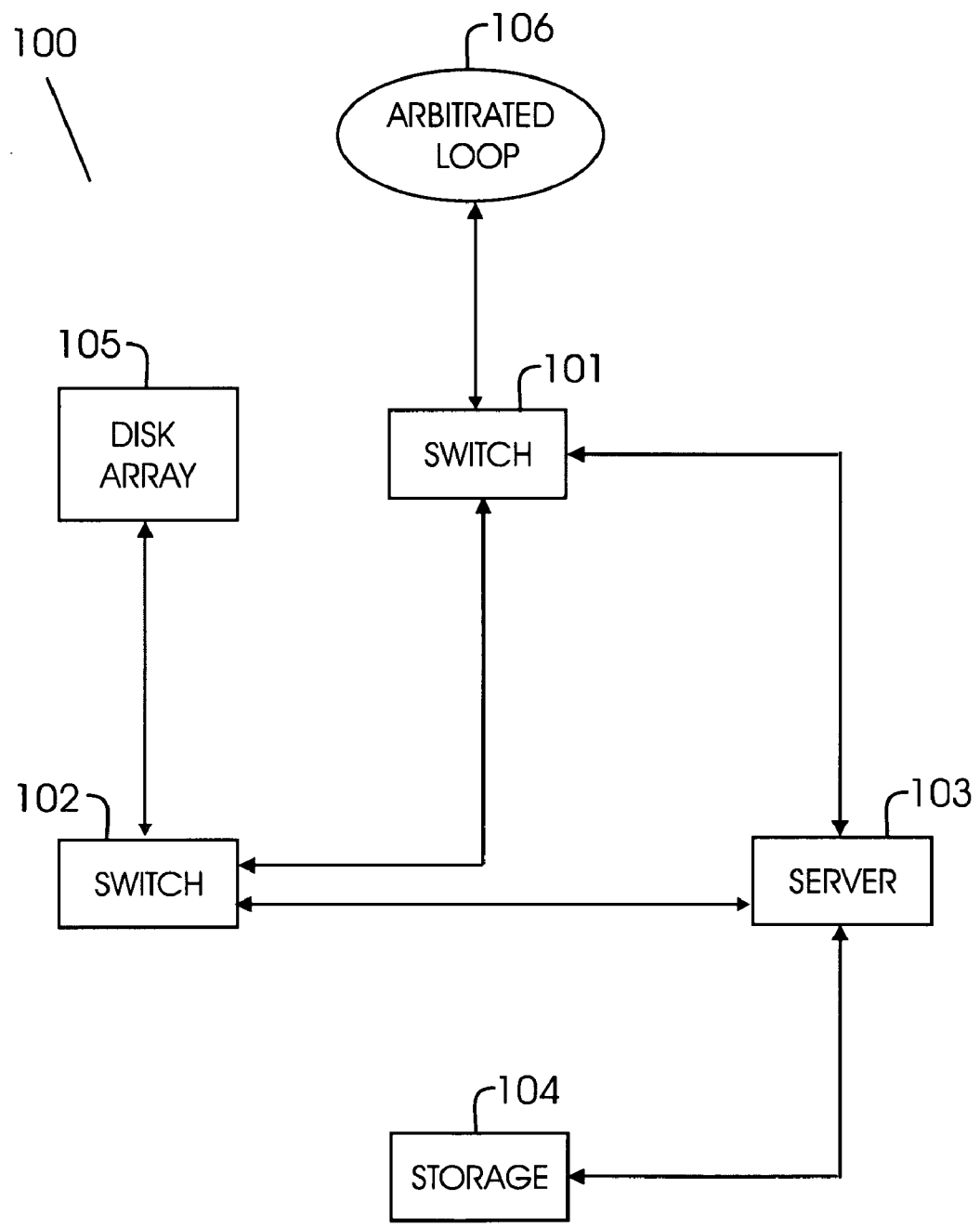
FIG. 1A shows an example of a Fibre Channel network system.

FIG. 1A is a block diagram of a fibre channel system 100 implementing the methods and systems in accordance with the adaptive aspects of the present invention. System 100 includes plural devices that are interconnected. Each device includes one or more ports, classified as node ports (N_Ports), fabric ports (F_Ports), and expansion ports (E_Ports). Node ports may be located in a node device, e.g. server 103, disk array 105 and storage device 104. Fabric ports are located in fabric devices such as switch 101 and 102. Arbitrated loop 106 may be operationally coupled to switch 101 using arbitrated loop ports (FL_Ports).

The devices of FIG. 1A are operationally coupled via "links" or "paths". A path may be established between two N_ports, e.g. between server 103 and storage 104. A packetswitched path may be established using multiple links, e.g. an N-Port in server 103 may establish a path with disk array 105 through switch 102.

Fabric Switch Element

Figure 1B:
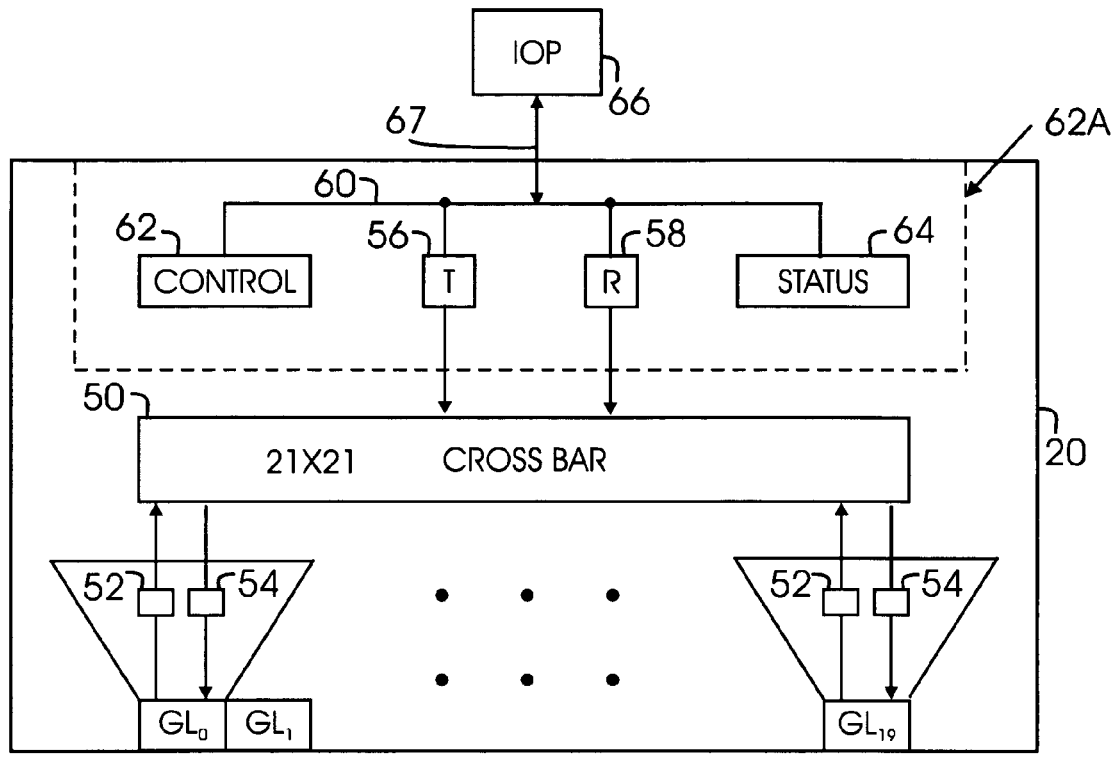
FIG. 1B shows an example of a Fibre Channel switch element, according to one aspect of the present invention.

FIG. 1B is a block diagram of a 20-port ASIC ("Application Specific Integrated Circuit") fabric element according to one aspect of the present invention. FIG. 1B provides the general architecture of a 20-channel switch chassis using the 20-port fabric element. Fabric element includes ASIC 20 with non-blocking fibre channel class 2 (connectionless, acknowledged) and class 3 (connectionless, unacknowledged) service between any ports. It is noteworthy that ASIC 20 may also be designed for class 1 (connection-oriented) service, within the scope and operation of the present invention as described herein.

The fabric element of the present invention is presently implemented as a single CMOS ASIC, and for this reason the term "fabric element" and ASIC are used interchangeably to refer to the preferred embodiments in this specification. Although FIG. 1B shows 20 ports, the present invention is not limited to any particular number of ports.

ASIC 20 has 20 ports numbered in FIG. 1B as GL0 through GL19. These ports are generic to common Fibre Channel port types, for example, F_Port, FL_Port and E-Port. In other words, depending upon what is attached to, each generic port (also referred to as GL Ports) can function as any type of port. Also, the GL port may function as a special port useful in fabric element linking, as described below.

For illustration purposes only, all GL ports are drawn on the same side of ASIC 20 in FIG. 1B. However, the ports may be located on both sides of ASIC 20 as shown in other figures. This does not imply any difference in port or ASIC design. Actual physical layout of the ports will depend on the physical layout of the ASIC.

Each port GL0-GL19 has transmit and receive connections to switch crossbar 50. One connection is through receive buffer 52, which functions to receive and temporarily hold a frame during a routing operation. The other connection is through a transmit buffer 54.

Switch crossbar 50 includes a number of switch crossbars for handling specific types of data and data flow control information. For illustration purposes only, switch crossbar 50 is shown as a single crossbar. Switch crossbar 50 is a connectionless crossbar (packet switch) of known conventional design, sized to connect 21×21 paths. This is to accommodate 20 GL ports plus a port for connection to a fabric controller, which may be external to ASIC 20.

Figure 1C:
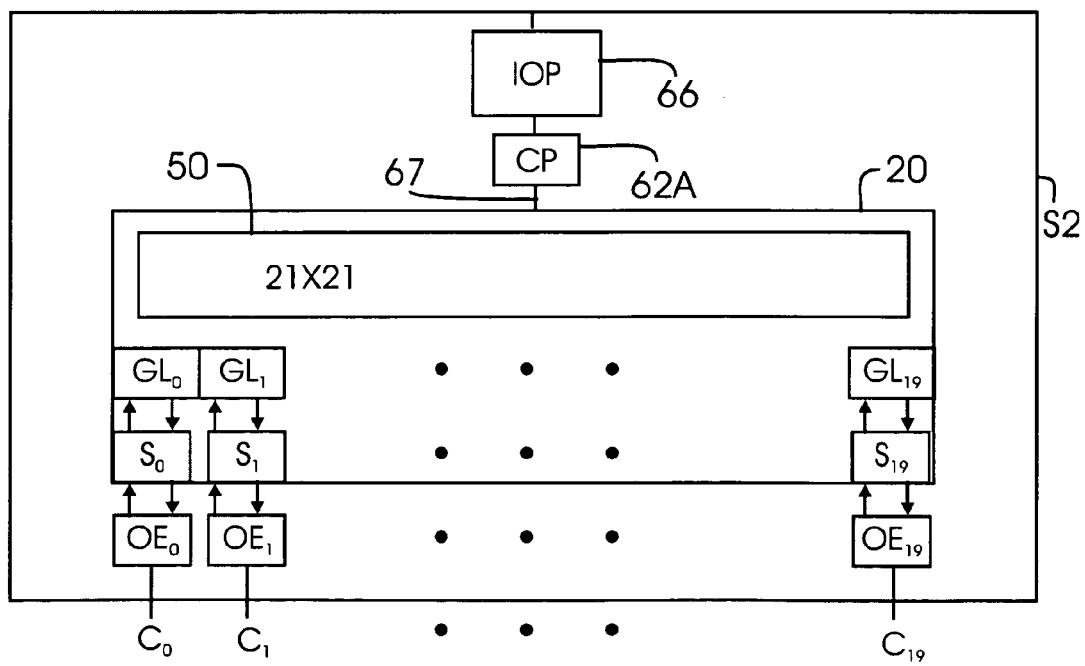
FIG. 1C shows a block diagram of a 20-channel switch chassis, according to one aspect of the present invention.

In the preferred embodiments of switch chassis described herein, the fabric controller is a firmware-programmed microprocessor, also referred to as the input/out processor ("IOP"). IOP 66 is shown in FIG. 1C as a part of a switch chassis utilizing one or more of ASIC 20. As seen in FIG. 1B, bi-directional connection to IOP 66 is routed through port 67, which connects internally to a control bus 60. Transmit buffer 56 (also referred to as "T"), receive buffer 58 (also referred to as "R"), control register 62 and Status register 64 connect to bus 60. Transmit buffer 56 and receive buffer 58 connect the internal connectionless switch crossbar 50 to IOP 66 so that it can source or sink frames.

Control register 62 receives and holds control information from IOP 66, so that IOP 66 can change characteristics or operating configuration of ASIC 20 by placing certain control words in register 62. IOP 66 can read status of ASIC 20 by monitoring various codes that are placed in status register 64 by monitoring circuits (not shown).

FIG. 1C shows a 20-channel switch chassis S2 using ASIC 20 and IOP 66. S2 will also include other elements, for example, a power supply (not shown). The 20 GL ports correspond to channel (also referred to as "C") C0-C19. Each GL port has a serial/deserializer (SERDES) (also referred as "S") designated as S0-S19. Ideally, the SERDES functions are implemented on ASIC 20 for efficiency, but may alternatively be external to each GL port.

Each GL port has an optical-electric converter (also referred to as "OE"), designated as OE0-OE19 connected with its SERDES through serial lines, for providing fibre optic input/output connections, as is well known in the high performance switch design. The converters connect to switch channels C0-C19. It is noteworthy that the ports can connect through copper paths or other means instead of optical-electric converters.

Figure 1D:
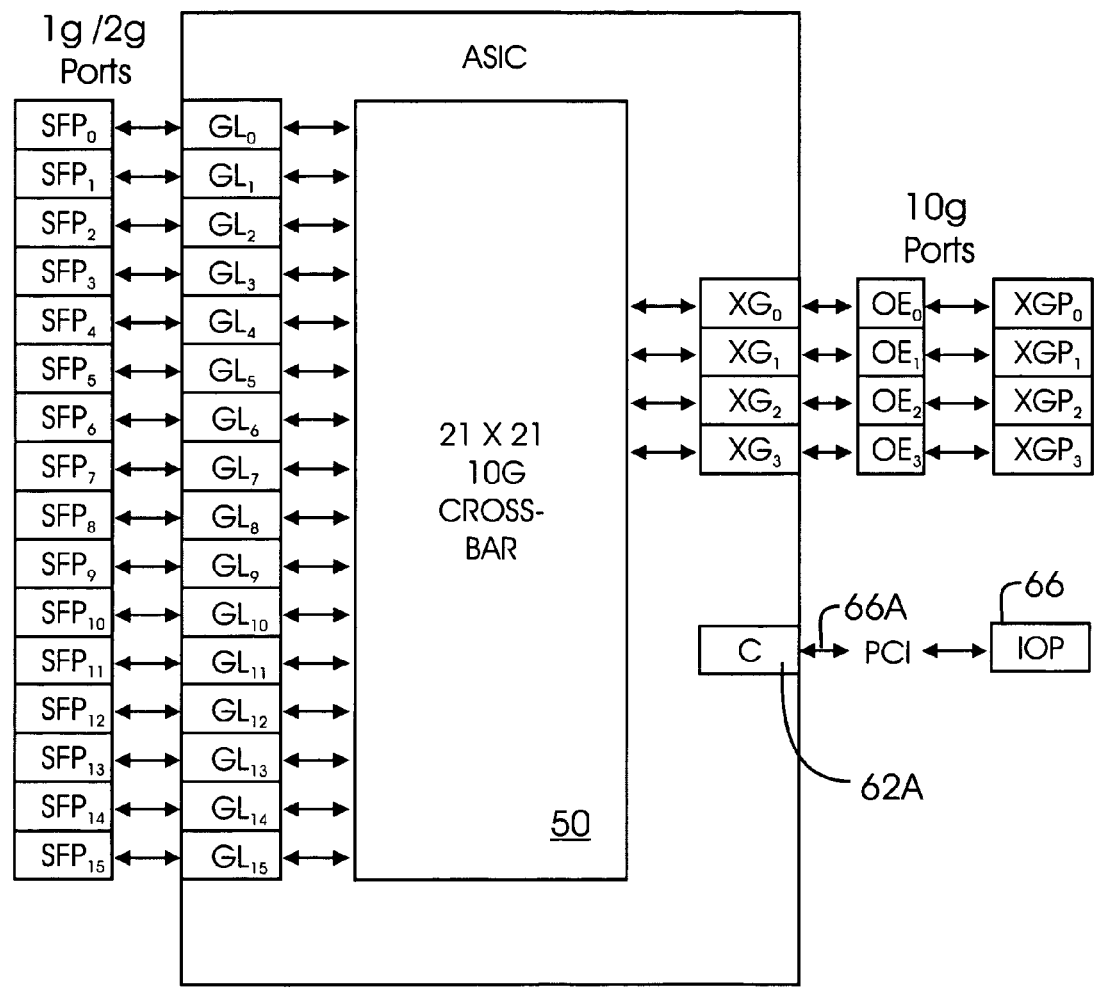
FIG. 1D shows a block diagram of a Fibre Channel switch element with sixteen GL_Ports and four 10 G ports, according to one aspect of the present invention.

FIG. 1D shows a block diagram of ASIC 20 with sixteen GL ports and four 10 G (Gigabyte) port control modules designated as $XG_0$-$XG_3$ for four 10 G ports designated as XGP0-XGP3. GL ports ($GL_0$-$GL_{15}$) communicate with 1g/2g SFP Port modules $SFP_0$-$SFP_{15}$. SFP is a small form factor pluggable optical transceiver. ASIC 20 include a control port 62A (also referred to as "CP") that is coupled to IOP 66 through a peripheral component interconnect "PCI") connection 66A.

Figures 1, 1E:
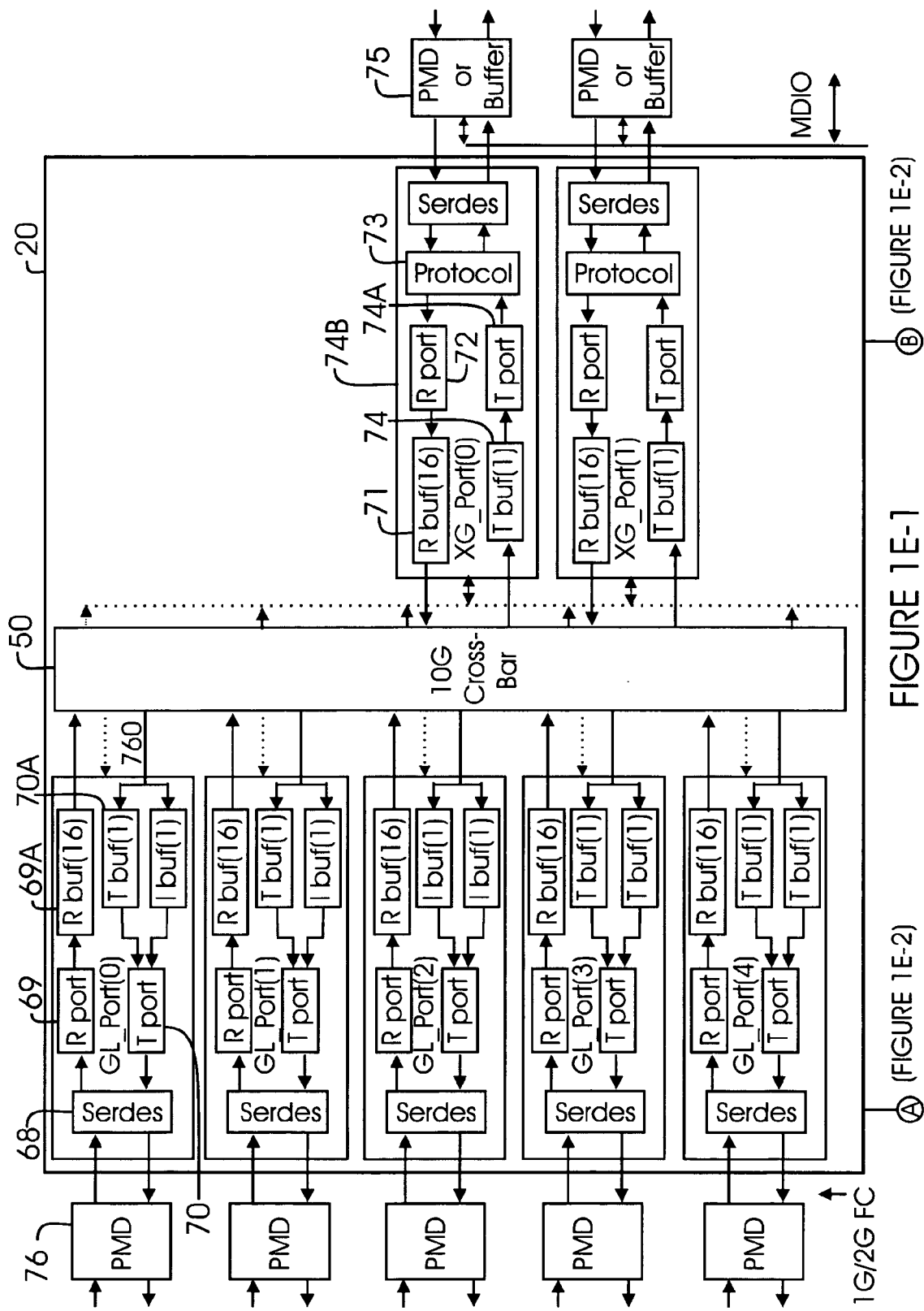
FIGS. 1E-1/1E-2 (jointly referred to as FIG. 1E) show another block diagram of a Fibre Channel switch element with sixteen GL_Ports and four 10 G ports, according to one aspect of the present invention.

FIG. 1E-1/1E-2 (jointly referred to as FIG. 1E) show yet another block diagram of ASIC 20 with sixteen GL and four XG port control modules. Each GL port control module has a Receive port (RPORT) 69 with a receive buffer (RBUF) 69A and a transmit port 70 with a transmit buffer (TBUF) 70A, as described below in detail. GL and XG port control modules are coupled to physical media devices ("PMD") 76 and 75 respectively.

Control port module 62A includes control buffers 62B and 62D for transmit and receive sides, respectively. Module 62A also includes a PCI interface module 62C that allows interface with IOP 66 via a PCI bus 66A.

XG_Port (for example 74B) includes RPORT 72 with RBUF 71 similar to RPORT 69 and RBUF 69A and a TBUF and TPORT similar to TBUF 70A and TPORT 70. Protocol module 73 interfaces with SERDES to handle protocol based functionality.

Figure 3A:
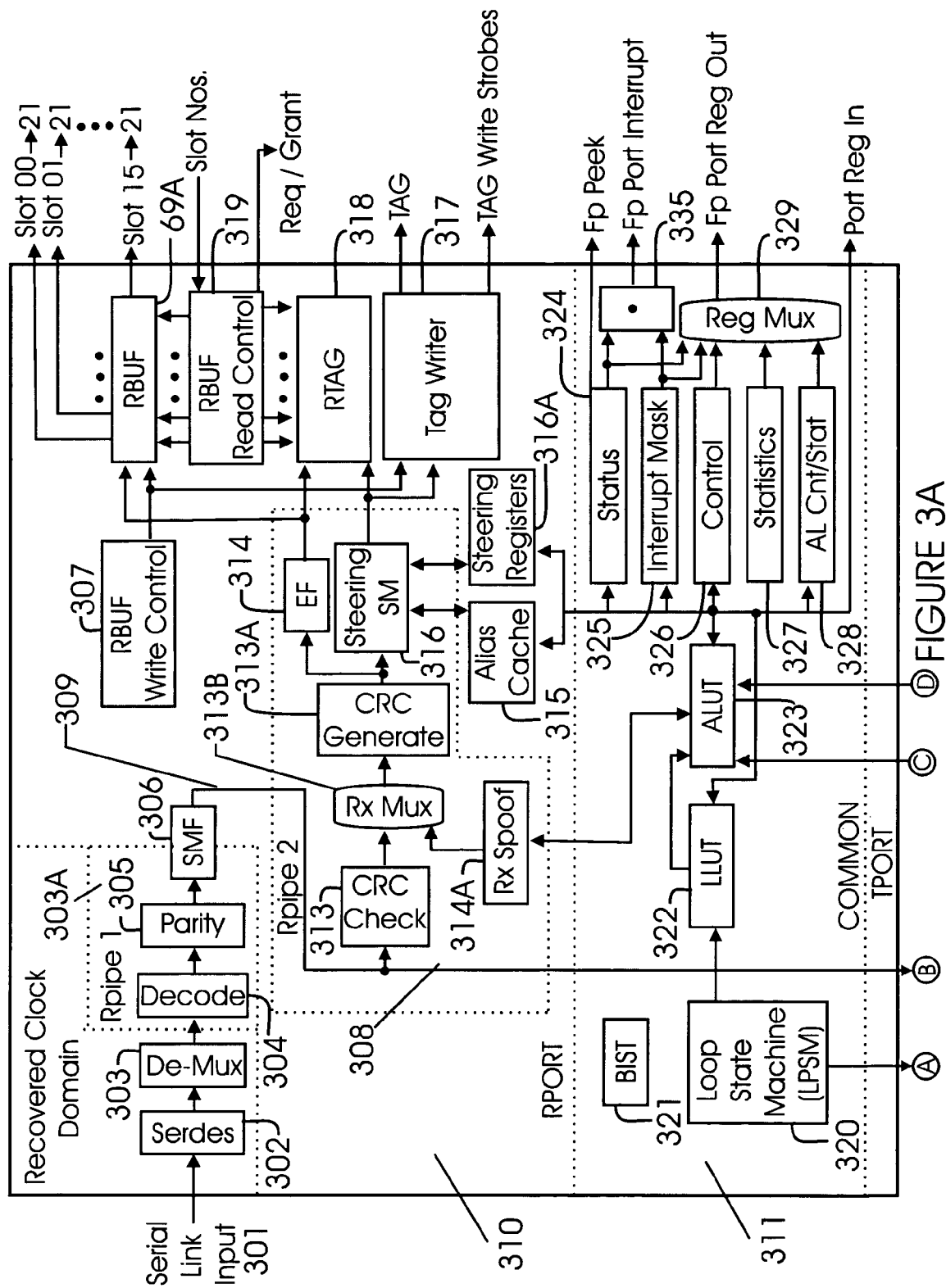
FIGS. 3A/3B (jointly referred to as FIG. 3) show a block diagram of a GL_Port, according to one aspect of the present invention.
Figure 3B:
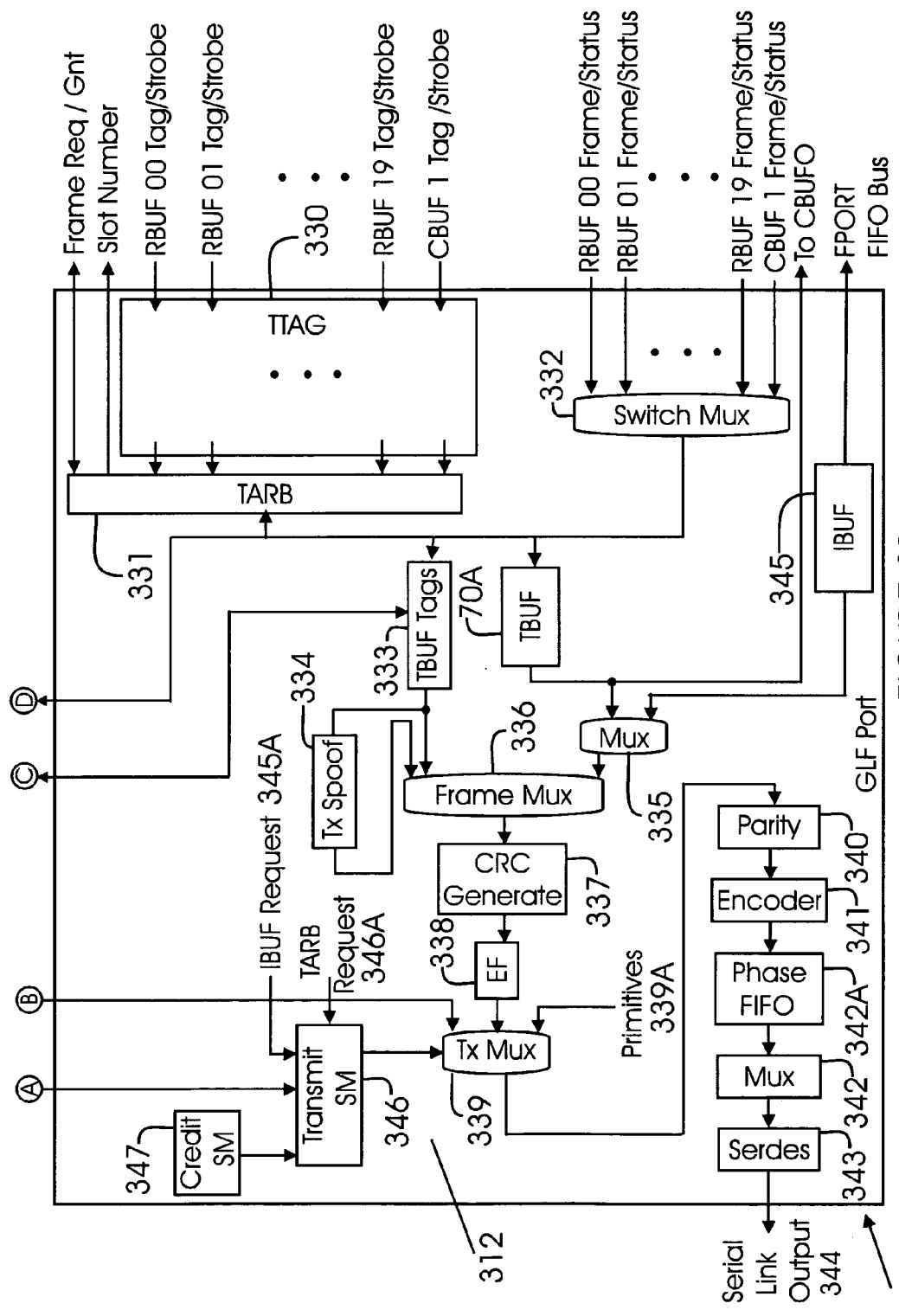

GL_Port:

FIGS. 3A-3B (referred to as FIG. 3) show a detailed block diagram of a GL port as used in ASIC 20. GL port 300 (also referred as GLF port) is shown in three segments, namely, receive segment (RPORT) 310, transmit segment (TPORT) 312 and common segment 311.

Receive Segment of GL_Port:

Frames enter through link 301 and SERDES 302 converts data into 10-bit parallel data to fibre channel characters, which are then sent to receive pipe ("Rpipe", may also be referred to as "Rpipe1" or "Rpipe2") 303A via a de-multiplexer (DEMUX) 303. Rpipe 303A includes, parity module 305 and decoder 304. Decoder 304 decodes 10B data to 8B and parity module 305 adds a parity bit. Rpipe 303A also performs various Fibre Channel standard functions such as detecting a start of frame (SOF), end-of frame (EOF), Idles, R_RDYs (fibre channel standard primitive) and the like, which are not described since they are standard functions.

Rpipe 303A connects to smoothing FIFO (SMF) module 306 that performs smoothing functions to accommodate clock frequency variations between remote transmitting and local receiving devices.

Frames received by RPORT 310 are stored in receive buffer (RBUF) 69A, (except for certain Fibre Channel Arbitrated Loop (AL) frames). Path 309 shows the frame entry path, and all frames entering path 309 are written to RBUF 69A as opposed to the AL path 308.

Cyclic redundancy code (CRC) module 313 further processes frames that enter GL port 300 by checking CRC and processing errors according to FC_PH rules. The frames are subsequently passed to RBUF 69A where they are steered to an appropriate output link. RBUF 69A is a link receive buffer and can hold multiple frames.

Reading from and writing to RBUF 69A are controlled by RBUF read control logic ("RRD") 319 and RBUF write control logic ("RWT") 307, respectively. RWT 307 specifies which empty RBUF 69A slot will be written into when a frame arrives through the data link via multiplexer ("Mux") 313B, CRC generate module 313A and EF (external proprietary format) module 314. EF module 314 encodes proprietary (i.e: non-standard) format frames to standard Fibre Channel 8B codes. Mux 313B receives input from Rx Spoof module 314A, which encodes frames to a proprietary format (if enabled). RWT 307 controls RBUF 69A write addresses and provide the slot number to tag writer ("TWT") 317.

RRD 319 processes frame transfer requests from RBUF 69A. Frames may be read out in any order and multiple destinations may get copies of the frames.

Steering state machine (SSM or Steering SM) 316 receives frames and determines the destination for forwarding the frame. SSM 316 produces a destination mask, where there is one bit for each destination. Any bit set to a certain value, for example, 1, specifies a legal destination, and there can be multiple bits set, if there are multiple destinations for the same frame (multicast or broadcast).

SSM 316 makes this determination using information from alias cache 315, steering registers 316A, control register 326 values and frame contents. IOP 66 writes all tables so that correct exit path is selected for the intended destination port addresses.

The destination mask from SSM 316 is sent to TWT 317 and a RBUF tag register (RTAG) 318. TWT 317 writes tags to all destinations specified in the destination mask from SSM 316. Each tag identifies its corresponding frame by containing an RBUF 69A slot number where the frame resides, and an indication that the tag is valid.

Each slot in RBUF 69A has an associated set of tags, which are used to control the availability of the slot. The primary tags are a copy of the destination mask generated by SSM 316. As each destination receives a copy of the frame, the destination mask in RTAG 318 is cleared. When all the mask bits are cleared, it indicates that all destinations have received a copy of the frame and that the corresponding frame slot in RBUF 69A is empty and available for a new frame.

RTAG 318 also has frame content information that is passed to a requesting destination to pre-condition the destination for the frame transfer. These tags are transferred to the destination via a read multiplexor (RMUX) (not shown).

Transmit Segment of GL_Port:

Transmit segment ("TPORT") 312 performs various transmit functions. Transmit tag register (TTAG) 330 provides a list of all frames that are to be transmitted. Tag Writer 317 or common segment 311 write TTAG 330 information. The frames are provided to arbitration module ("transmit arbiter" ("TARB")) 331, which is then free to choose which source to process and which frame from that source to be processed next.

TTAG 330 includes a collection of buffers (for example, buffers based on a first-in first out ("FIFO") scheme) for each frame source. TTAG 330 writes a tag for a source and TARB 331 then reads the tag. For any given source, there are as many entries in TTAG 330 as there are credits in RBUF 69A.

TARB 331 is activated anytime there are one or more valid frame tags in TTAG 330. TARB 331 preconditions its controls for a frame and then waits for the frame to be written into TBUF 70A. After the transfer is complete, TARB 331 may request another frame from the same source or choose to service another source.

TBUF 70A is the path to the link transmitter. Typically, frames don't land in TBUF 70A in their entirety. Mostly, frames simply pass through TBUF 70A to reach output pins, if there is a clear path.

Switch Mux 332 is also provided to receive output from crossbar 50. Switch Mux 332 receives input from plural RBUFs (shown as RBUF 00 to RBUF 19), and input from CPORT 62A shown as CBUF 1 frame/status. TARB 331 determines the frame source that is selected and the selected source provides the appropriate slot number. The output from Switch Mux 332 is sent to ALUT 323 for S_ID spoofing and the result is fed into TBUF Tags 333.

TMUX ("TxMux") 339 chooses which data path to connect to the transmitter. The sources are: primitive sequences specified by IOP 66 via control registers 326 (shown as primitive 339A), and signals as specified by Transmit state machine ("TSM") 346, frames following the loop path, or steered frames exiting the fabric via TBUF 70A.

TSM 346 chooses the data to be sent to the link transmitter, and enforces all fibre Channel rules for transmission. TSM 346 receives requests to transmit from loop state machine 320, TBUF 70A (shown as TARB request 346A) and from various other IOP 66 functions via control registers 326 (shown as IBUF Request 345A). TSM 346 also handles all credit management functions, so that Fibre Channel connectionless frames are transmitted only when there is link credit to do so.

Loop state machine ("LPSM") 320 controls transmit and receive functions when GL_Port is in a loop mode. LPSM 320 operates to support loop functions as specified by FC-AL-2.

IOP buffer ("IBUF") 345 provides IOP 66 the means for transmitting frames for special purposes.

Frame multiplexer ("Frame Mux" or "Mux") 336 chooses the frame source, while logic (TX spoof 334) converts D_ID and S_ID from public to private addresses. Frame Mux 336 receives input from Tx Spoof module 334, TBUF tags 333, and Mux 335 to select a frame source for transmission.

EF module 338 encodes proprietary (i.e. non-standard) format frames to standard Fibre Channel 8B codes and CRC module 337 generates CRC data for the outgoing frames.

Modules 340-343 put a selected transmission source into proper format for transmission on an output link 344. Parity 340 checks for parity errors, when frames are encoded from 8B to 10B by encoder 341, marking frames "invalid", according to Fibre Channel rules, if there was a parity error. Phase FIFO 342A receives frames from encode module 341 and the frame is selected by Mux 342 and passed to SERDES 343. SERDES 343 converts parallel transmission data to serial before passing the data to the link media. SERDES 343 may be internal or external to ASIC 20.

Common Segment of GL_Port:

As discussed above, ASIC 20 include common segment 311 comprising of various modules. LPSM 320 has been described above and controls the general behavior of TPORT 312 and RPORT 310.

A loop look up table ("LLUT") 322 and an address look up table ("ALUT") 323 is used for private loop proxy addressing and hard zoning managed by firmware.

Common segment 311 also includes control register 326 that controls bits associated with a GL_Port, status register 324 that contains status bits that can be used to trigger interrupts, and interrupt mask register 325 that contains masks to determine the status bits that will generate an interrupt to IOP 66. Common segment 311 also includes AL control and status register 328 and statistics register 327 that provide accounting information for FC management information base ("MIB").

Output from status register 324 may be used to generate a Fp Peek function. This allows a status register 324 bit to be viewed and sent to the CPORT.

Output from control register 326, statistics register 327 and register 328 (as well as 328A for an X_Port, shown in FIG. 4) is sent to Mux 329 that generates an output signal (FP Port Reg Out).

Output from Interrupt register 325 and status register 324 is sent to logic 335 to generate a port interrupt signal (FP Port Interrupt).

BIST module 321 is used for conducting embedded memory testing.

XG_Port

Figure 4A:
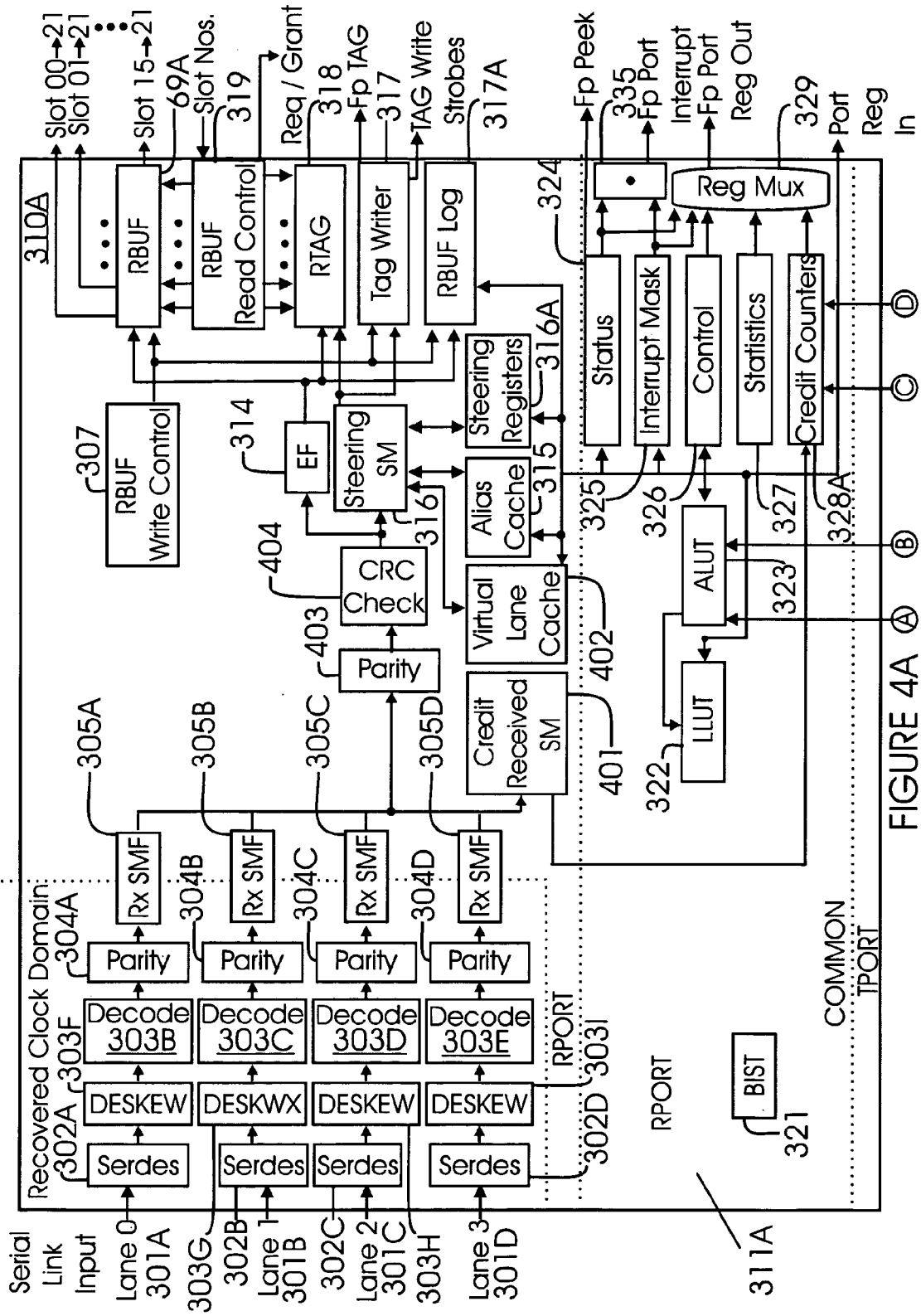
FIGS. 4A/4B (jointly referred to as FIG. 3) show a block diagram of XG_Port (10 G) port, according to one aspect of the present invention.
Figure 4B:
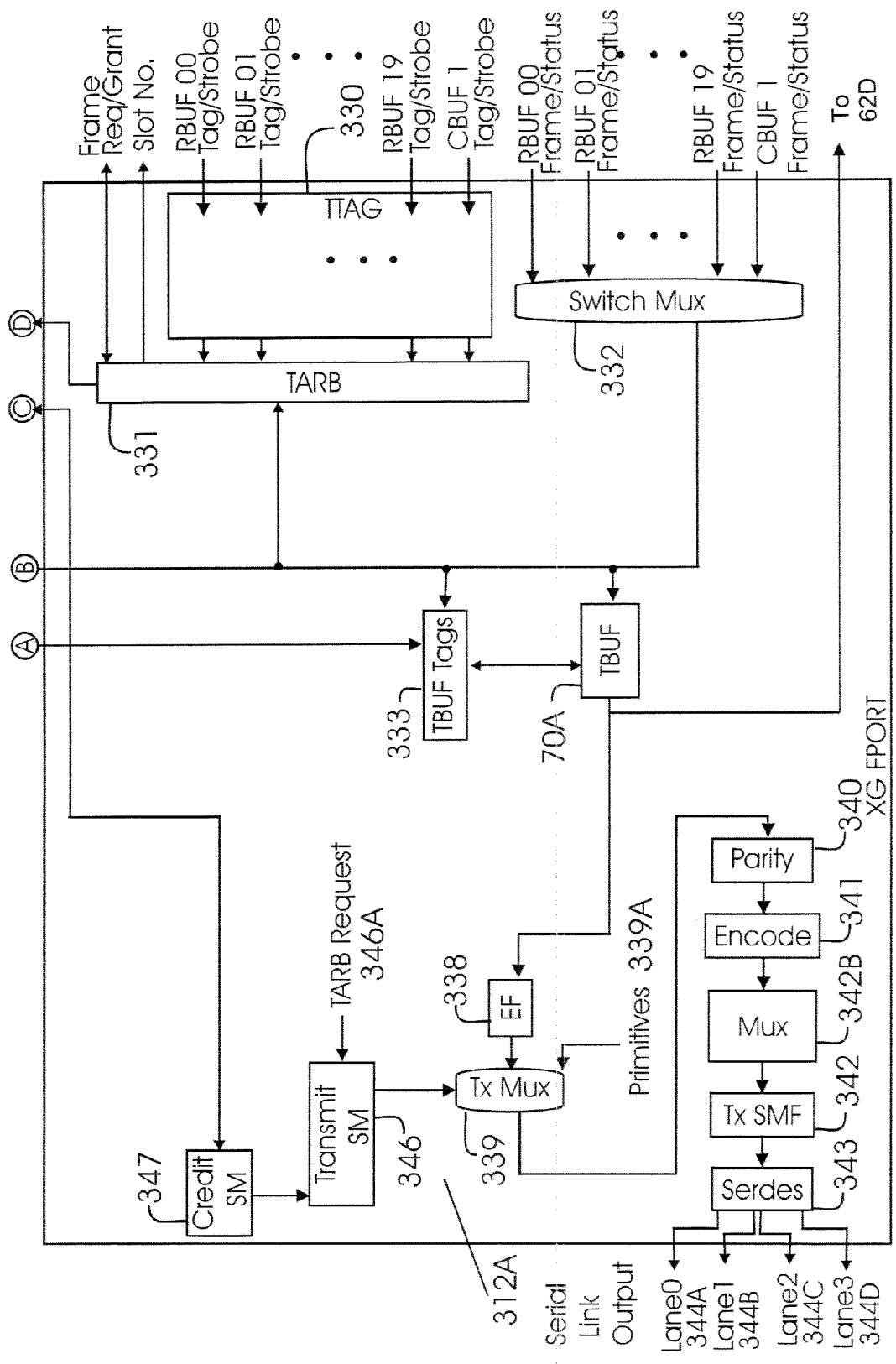

FIGS. 4A-4B (referred to as FIG. 4) show a block diagram of a 10G Fibre Channel port control module (XG FPORT) 400 used in ASIC 20. Various components of XG FPORT 400 are similar to GL port control module 300 that are described above. For example, RPORT 310 and 310A, Common Port 311 and 311A, and TPORT 312 and 312A have common modules as shown in FIGS. 3 and 4 with similar functionality.

RPORT 310A can receive frames from links (or lanes) 301A-301D and transmit frames to lanes 344A-344D. Each link has a SERDES (302A-302D), a de-skew module, a decode module (303B-303E) and parity module (304A-304D). Each lane also has a smoothing FIFO (SMF) module 305A-305D that performs smoothing functions to accommodate clock frequency variations. Parity errors are checked by module 403, while CRC errors are checked by module 404.

RPORT 310A uses a virtual lane ("VL") cache 402 that stores plural vector values that are used for virtual lane assignment. In one aspect of the present invention, VL Cache 402 may have 32 entries and two vectors per entry. IOP 66 is able to read or write VL cache 402 entries during frame traffic. State machine 401 controls credit that is received. On the transmit side, credit state machine 347 controls frame transmission based on credit availability. State machine 347 interfaces with credit counters 328A.

Also on the transmit side, modules 340-343 are used for each lane 344A-344D, i.e., each lane can have its own module 340-343. Parity module 340 checks for parity errors and encode module 341 encodes 8-bit data to 10 bit data. Mux 342B sends the 10-bit data to a smoothing ("TxSMF") module 342 that handles clock variation on the transmit side. SERDES 343 then sends the data out to the link.

Programmable Data Dependent Network Routing:

In one aspect of the present invention, a versatile routing technique/system is provided that allows selection of plural routes to a destination. The routes can be selected based on fields in the fibre channel frame header. The choice of routes can be used for load balancing or for setting up preferred routes, as described below.

Figures 1, 1E, 2:
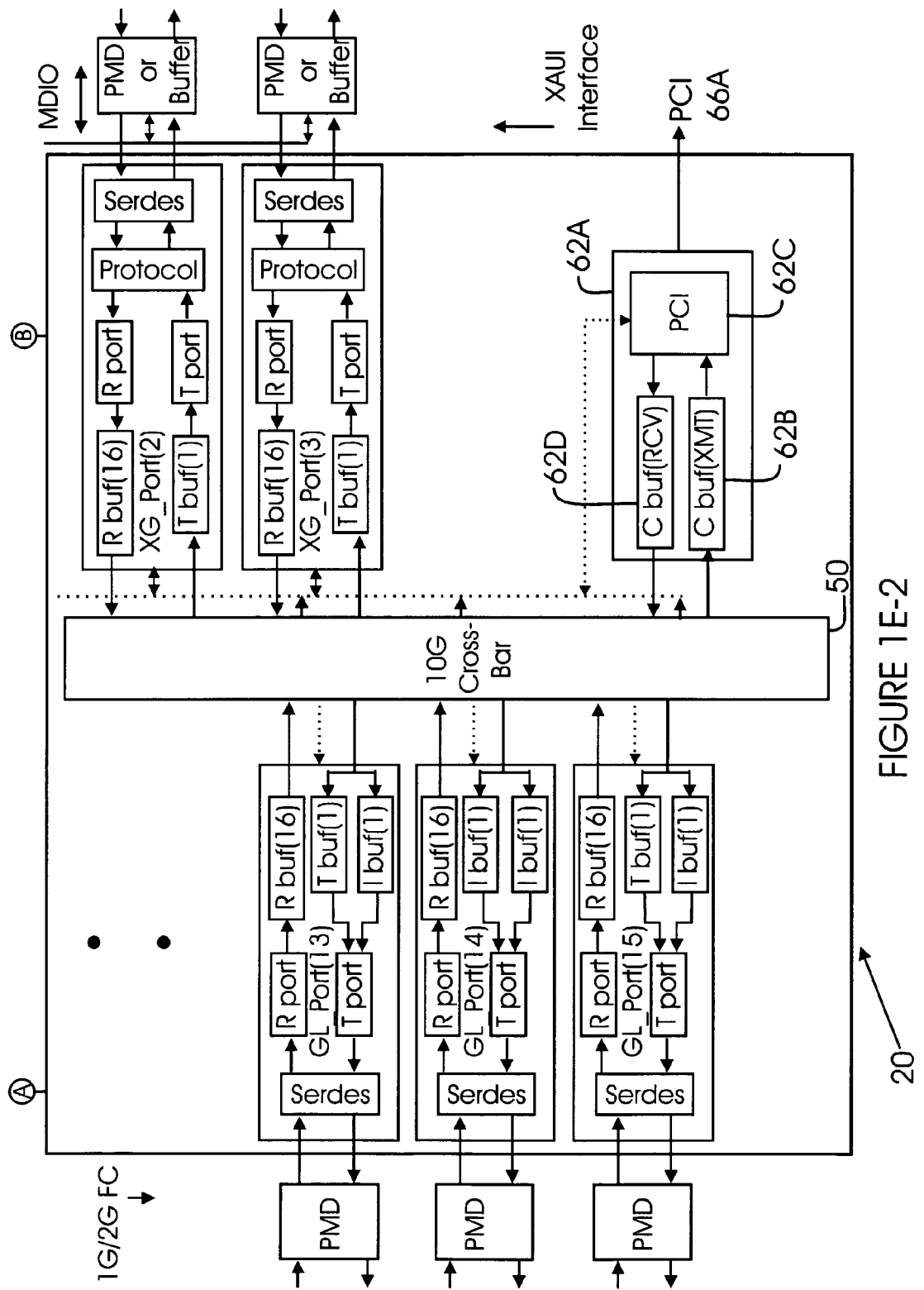
FIG. 2 shows a block diagram of a look up table used for routing frames, according to one aspect of the present invention.
Figure 2:
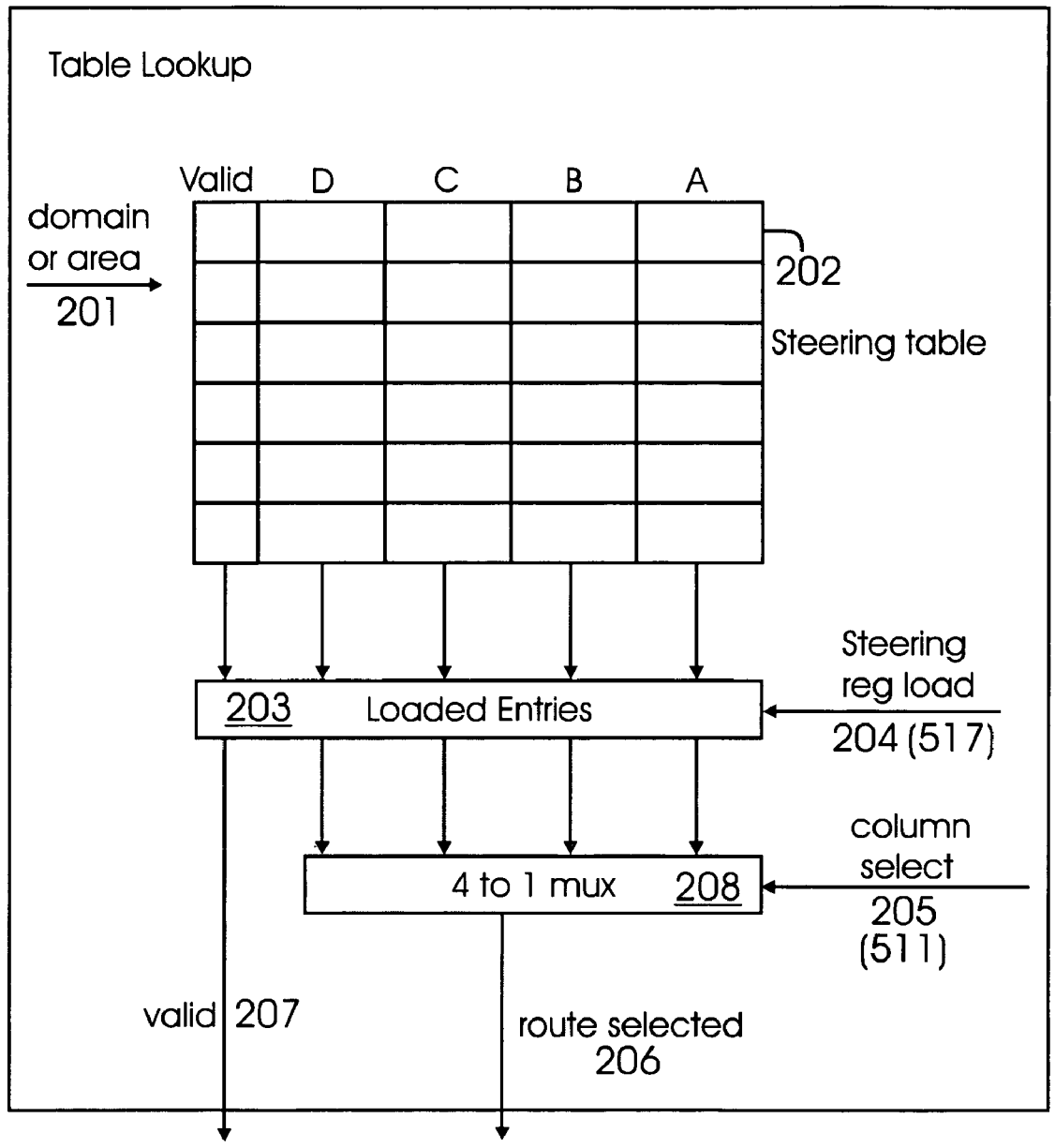

In one aspect of the present invention, a "column" steering system is used for routing frames. FIG. 2 shows a block diagram of system 200 that is used to route frames, according to one aspect of the present invention.

System 200 includes a steering table (may also be referred to as a look up table ("LUT")) 202 (similar to LUT 322) that receives Domain bits (16-23 bits) or Area bits(8-21) bits of the D_ID values 201. Domain bits are used to steer frames to a different switch, while Area bits are used to steer within a local switch. It is noteworthy that values 201 may also include virtual storage area network numbers ("VSAN #"), ALPA values, or any other parameter.

When a frame is received, Domain/Area/VSAN, hashing module 510A output and/or ALPA numbers are used to index LUT 202. Table values are loaded into register 203. This is performed by firmware. Steering register load signal 204 (same as 517 of FIG. 5) commands a table look up based on the frames that are passing through.

As shown in FIG. 2, columns A-D provide four different routing options. Column select signal (or value) 205 (same as 511 from FIG. 5) is used to select one of the destination routes. The column select value 205 determines which particular column (i.e. A-D) is selected for routing frames. A route 206 is selected based on the column via multiplexer 208. Register 203 also generates a valid signal 207.

Figure 5:
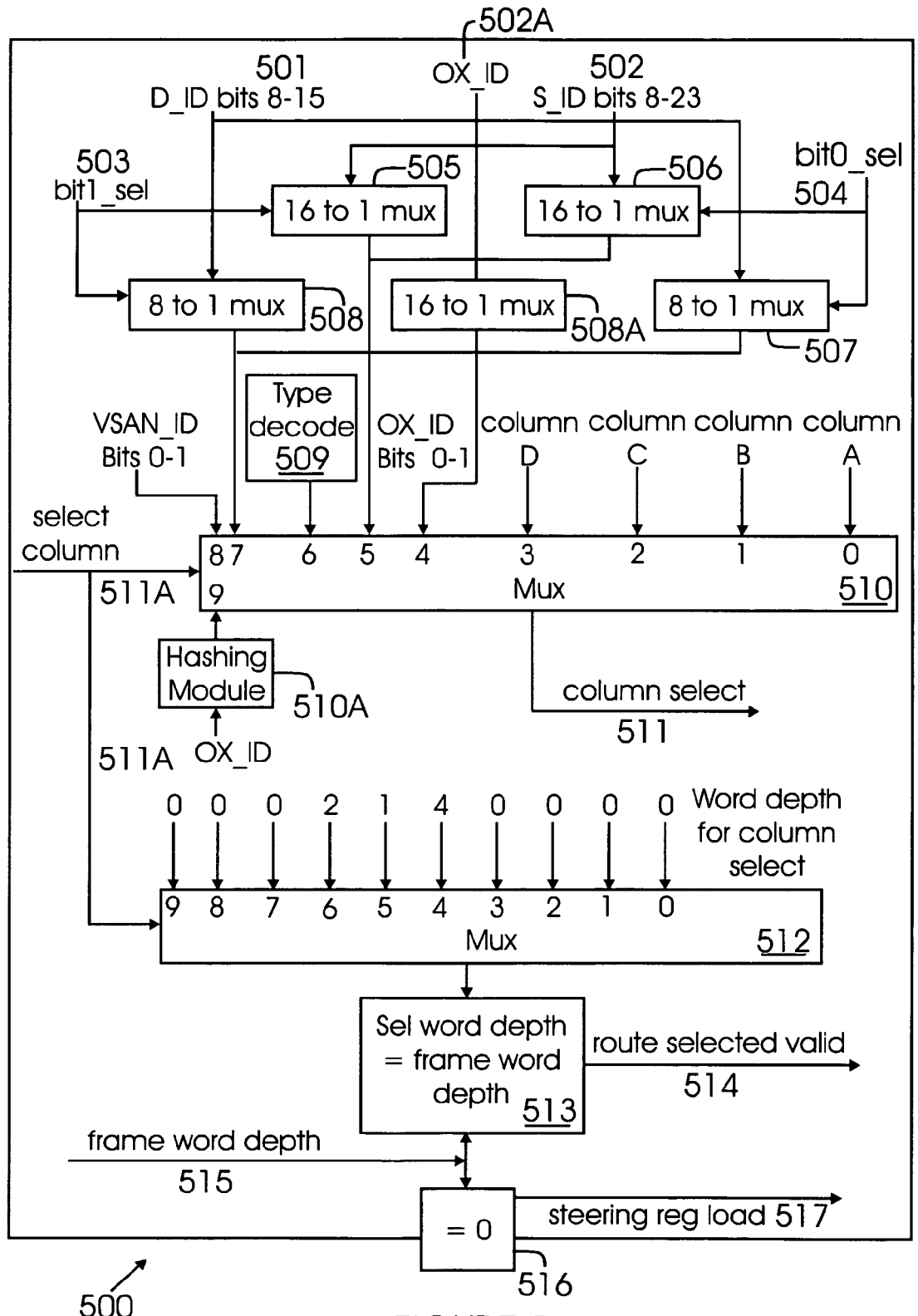
FIG. 5 shows a system for routing frames, according to one aspect of the present invention.

FIG. 5 shows a block diagram of a system that shows how the column select value 511 is determined. D_ID bits 501 and S_ID bits 502 are sent to multiplexer (MUX) 510, via Mux 508 and 506, respectively. OX_ID 502A is also sent to Mux 510 via Mux 508A. Mux 510 has 10 inputs, which are used for the column select signal 511. This may depend on the data in a frame header.

Fibre channel frames, for example, the OX_ID field values may be sent to hashing module 510A to generate a pseudo random number, which is described below in detail. The following provides a description of the 10 inputs used to generate column select signal 511:

0—Always use column A
    1—Always use column B
    2—Always use column C
    3—Always use column D
    4—Use bits from the Fibre Channel header OX_ID field (502A) to select the column. The bits from the OX_ID are selected by bit1_sel 503 (via Mux 505 and 508) and bit0_sel 504 (via Mux 506 and 507) values.
    5—Use bits from the Fibre Channel header S_ID field to select the column. The bits from the S_ID are selected by bit0_sel 503 and bit1_sel 504 values.
    6—Decode the Fibre Channel header Type field (509) to select the column. The values used are:
        5—(Internet Protocol) use column A
        8—(SCSI FCP) use column B
        88—(hex 0×58, Virtual Interface) use column C All others —use column D
    7—Use bits from the Fibre Channel header D_ID field to select the column. The bits from D_ID are selected by bit0_sel 503 and bit1_sel 504 values.
    8—Use bits from the VSAN_ID to select the column.
    9—Use the bits generated by hashing module 510A, as described below.

Bit0_sel 504 and bit1_sel 503 values are programmable by firmware and are used to select D_ID or S_ID bits if bit values 5 or 7 are used for the column select value 511.

Select column value (or signal/command) 511A is received from control register 326. This value is again programmable and is used to set the column select value 511 based on which a particular column value is used to route frames.

For domain steering, the domain part of the D_ID is not used for column select bits since that part of the address is already used to address the steering table 202. For area steering, D_ID is not needed for column select values because the domain is always the local switch domain, and area is used to look up steering table 202.

Select column signal 511A is also sent to Mux 512 that maps the 10 inputs of Mux 510 to actual frame depth. For example, if OX_ID (bit 4, from Mux 510) is used for routing, then the fourth word in the frame header must be read. If D_ID is used, then the $0^{th}$ word must be read.

Based on the column select value 511, the selected word depth and the frame depth are matched by logic 513. If the match is correct, a valid route 514 is selected and sent to SSM 316.

Frame word depth 515 for every frame is sent to logic 513 and logic 516. When the 0$^{th}$ word of a frame is read, steering register load signal 517 (same as FIG. 2, signal 204) is generated that commands table look up, discussed above.

Hash Function:

In one aspect of the present invention, a hash function is used on OX_ID or other fibre channel header fields to route fibre channel frames. The hashing function optimizes usage of links between switches regardless of traffic source or destination. In order delivery is preserved within a Fibre Channel Exchange by using similar fields that have similar values within an Exchange, as described below.

Fibre channel frames take different routes through a Fabric and may not arrive at a destination in the same order as they were sent. If frames within the same fibre Channel Exchange arrive out of order, many conventional devices would generate an error. However, frames from two different exchanges arriving out of order may not be detected as an error. The hashing function, according to one aspect of the present invention, generates the same values causing the same route(s) to be taken for a particular exchange.

Hashing module 510A takes one or more fibre channel header fields (for example, "OX_ID") to generate a "pseudo random" value that can be used for column select 511. Hashing module 510A takes fibre channel header fields as input and outputs an index value. In one aspect, hashing module 510A uses the same field values in an Exchange. For example, the fields that are same in all frames in an Exchange are D_ID, S_ID and OX_ID. RX_ID may also be used as input to hashing module 510A since an originator must wait for a response from the responder to assign an RX_ID before sending another frames to the responder.

The following provides an example of using hashing module 510A for a switch port with four steering columns. This algorithm XORs some bits in the OX_ID to create 2 bits used for the column index.

```
Bit 0 = OX_ID bits 15^12^9^7^ 6^4^2^0
Bit 1 = OX_ID bits 15^14^13^12^8^7^4^3^2^1^0
The hashing algorithm may be implemented in
hardware and be done very quickly (1 clock).
Algorithm 2 - CRC calculation on XOR of OX_ID and
high 16 bits of S_ID
The following C code may be used to implement the
algorithm:
//
// Implement a CRC calculation to use as the index
into the steering columns.
// Real implementation would do this in hardware
for greater speed.
//
int algorithm(int ox_id, int s_id)
{
unsigned int r;
int value = 0;
int CRC_Table[ ] = { 0, 2, 4, 6 };
value = ox_id ^ (s_id >> 8);
r = 0;
for (int I = 14; I >= 0; I -= 2)
{
r = (r << 2) ^ CRC_Table[((r >> 2) ^ (value >> 1))
& 0x03];
}
// return 2 bit value to select one of 4 steering
columns
return (r >> 1) & 0x03;
```

The foregoing example is to illustrate the adaptive aspects of the present invention and is not intended to limit the present invention. For example, it is also possible to hash in the S_ID by either directly XORing the S_ID with the OX_ID or rotate destination ports that are loaded into LUT 322 as ingress port is changed, i.e., the routing table in port 0 is loaded in a different order than port 1. The same is possible by using the D_ID by loading a different order in the LUT for a given port but re-order the destination for different rows of the LUT.

Figure 8:
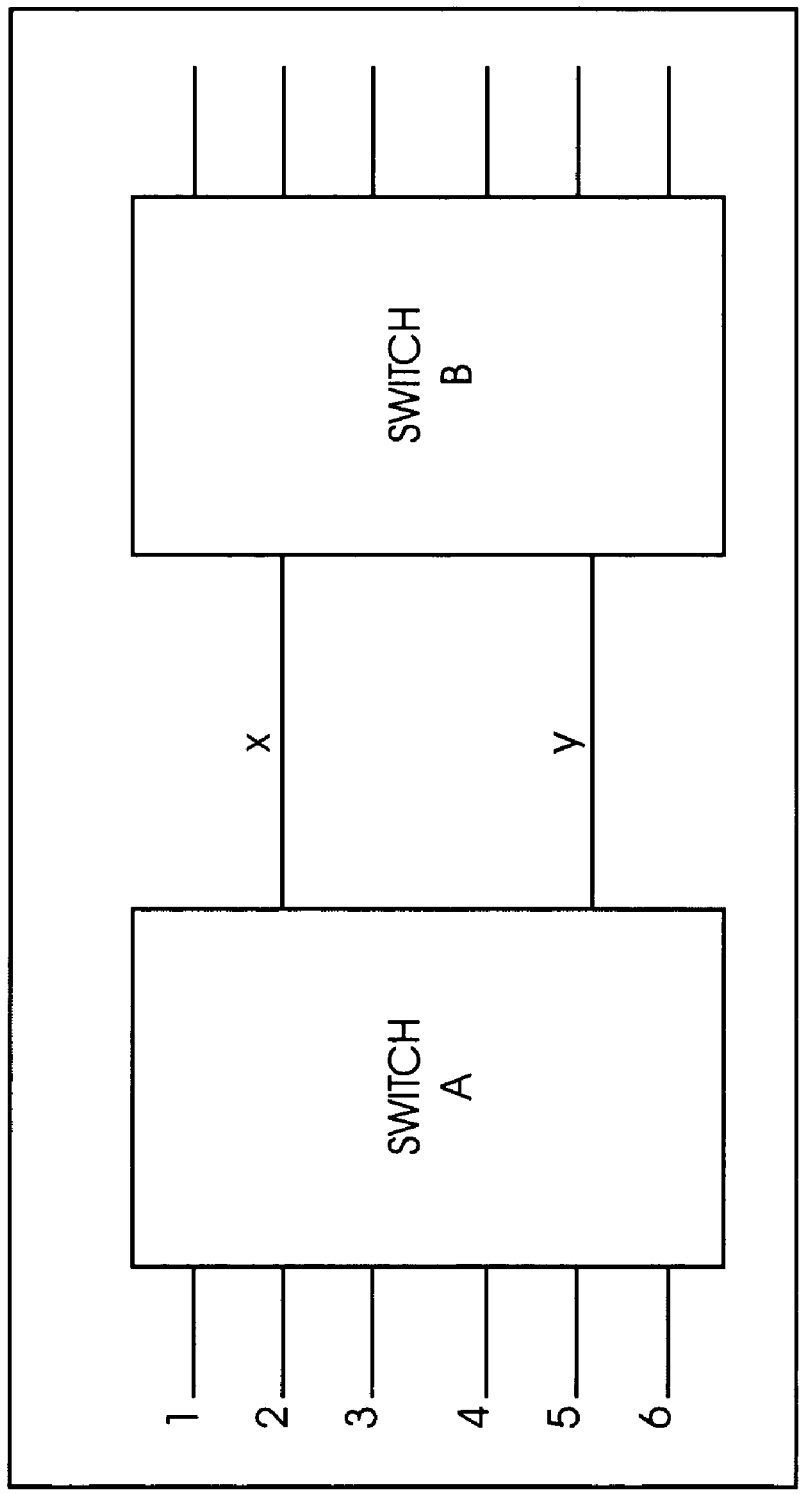

FIG. 8 provides an example, of how hashing module 510A may be used to improve performance. FIG. 8 shows two Fibre Channel switches with two links, x and y. Switch A and B have 6 N_ports each. Each of the N_ports attached to switch A always use the same ISL to send frames to switch B. The usage of the ISLs depends on what N_ports are sending frames. For illustration purposes only, ports 1, 3 and 5 use ISL x to send frames to switch B and ports 2, 4 and 6 use ISL y. If ports 1, 3 and 5 are sending data to switch B, all the data would go over ISL x and ISL y will be idle, hence only half the band-width will be used.

Hashing module 510A based steering uses ISLx for about half the exchanges and uses ISLy for the other half. Hence, even if each port has 1 exchange active at a given time, both ISLs are used half the time. Hence 75% of the bandwidth is used. If multiple Exchanges are active on the same port, the utilization is even better.

Figure 6:
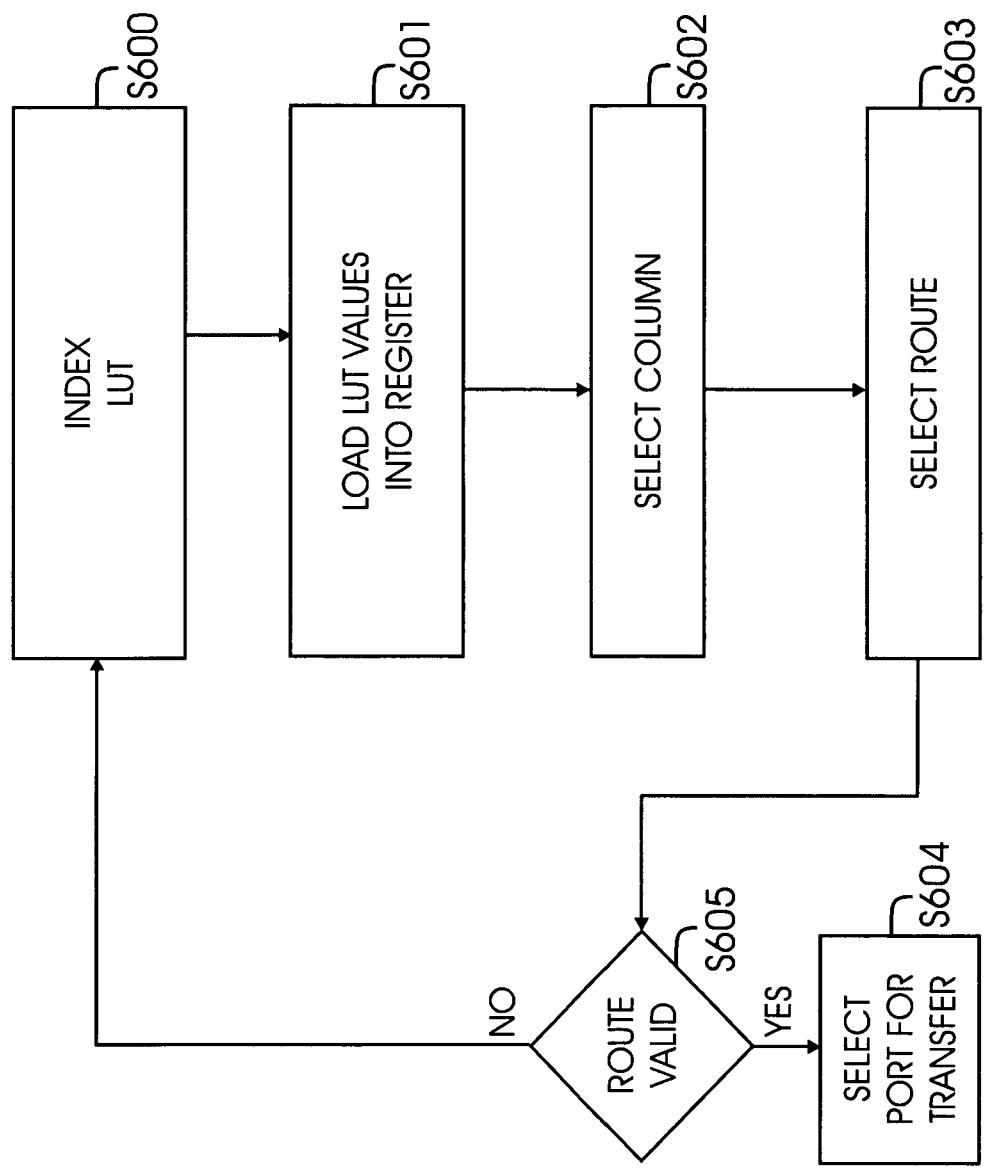
FIG. 6 shows a flow diagram of executable steps for routing frame, according to one aspect of the present invention.

FIG. 6 is a flow diagram of process steps, for routing frames, according to one aspect of the present invention.

In step S600, table 202 is indexed. Domain/Area/VSAN/ hashing module 510A output and/or ALPA numbers are used to index LUT 202.

In step S601, the indexed table values are loaded into register 203.

In step S602, a particular column is selected for routing. The column selection is based on select column signal 511A. One of the 10 inputs shown in MUX 510 can be used for routing frames.

In step S603, based on the column, a route is selected.

In step S605, the process determines if the route is valid. This can be performed by logic 513 that examines 207, which ensures that the correct LUT 322 entry was valid.

If the route is not valid, the process goes back to step S600 and the frame may be disposed or sent to IOP 66.

If the route is valid, then in step S604, a port is selected for transfer.

The following provides examples of how the present invention can be used for load balancing and/or preferred routing:

EXAMPLE 1

Figure 7A:
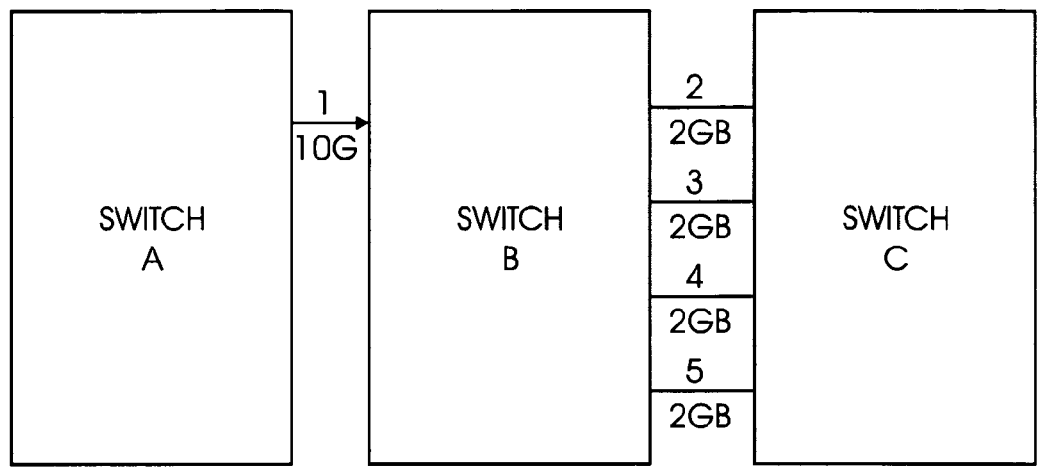
FIGS. 7A, 7B and 8 show examples of applying the routing techniques, according to one aspect of the present invention.

FIG. 7A shows that link 1 between switch A and B is a high-speed 10 Gigabit link. Links 2, 3, 4, and 5 are 2 Gigabit links. If all the traffic from switch A to switch C is through one of the 2 Gigabit links (i.e. links 2, 3, 4 or 5) then the 10 Gigabit link would not be able to send data faster than 2 Gigabits and hence cause congestion.

Using the column steering methodology described above, the receive port for link 1 on switch B will allow traffic destined for switch C to be routed through all 4 of the slower links to get better performance. S_ID, D_ID, OX_ID, VSAN number, hashing module 510A output or any other parameter may be used for the selecting the appropriate column.

EXAMPLE 2

Figure 7B:
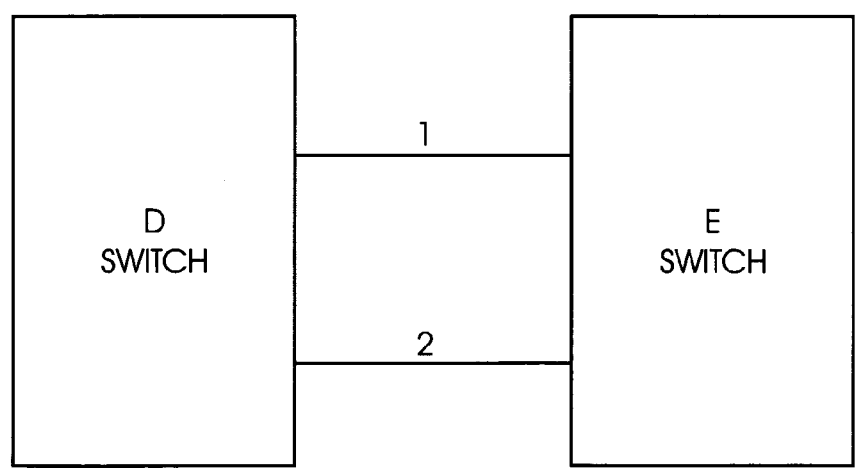

As shown in FIG. 7B, switches D and F are coupled via links 1 and 2. If ports on switch D want to send higher priority data to switch B, the lower 2 bits of the OX_ID may be reserved for the higher priority traffic. The higher priority traffic could use link 2, while all other traffic from D to F use link 1.

If the bits 0-1 of the OX_ID for high priority traffic are set to binary '11', the select column and steering tables for each port on switch D would be set as follows:

Select column=4 (bits 0-1 of OX_ID)
Steering table for Domain of switch E=
Column A=link 1
Column B=link 1
Column C=link 1
Column D=link 2

Although the present invention has been described with reference to specific embodiments, these embodiments are illustrative only and not limiting. Many other applications and embodiments of the present invention will be apparent in light of this disclosure and the following claims.

What is claimed is:

1. A method for routing fibre channel frames using a fibre channel switch element, comprising:
   (a) receiving a fibre channel frame at a port of the fibre channel switch element;
   (b) indexing a look up table by using an output value generated by a hashing module for the fibre channel switch element; a domain value for routing the fibre channel frame to another fibre channel switch, an area value for routing the fibre channel frame to a port of the fibre channel switch that received the fibre channel frame, a virtual storage area network identifier for routing the fibre channel frame within a virtual storage area network, and an arbitrated loop physical address (AL_PA) value included in a header of the fibre channel frame;
   (c) selecting a column value from the look up table based on a column select signal generated by a hardware logic; wherein the column select signal is based on the output value generated by the hashing module; and wherein the output value is a pseudo random number value generated by the hashing module by applying a hash function on a field of a fibre channel frame header of the fibre channel frame; and the pseudo random number value is used for selecting the column value used for routing the frame; and
   (d) based on the selected column value, routing the frame if a route is valid.

2. The method of claim 1, wherein the hashing module uses a same field value from the fibre channel frame header for a same fibre channel exchange to generate the pseudo random number value.

3. The method of claim 1, wherein the hash function is applied on an originator exchange identification field (OX_ID of the fibre channel frame to route the fibre channel frame.

4. A fibre channel switch element configured to select a route from amongst a plurality of routes, for routing fibre channel frames, the fibre channel switch element comprising:
   at least one port for receiving and transmitting a fibre channel frame;
   a look up table with a plurality of columns that are indexed by an output from a hashing module, a domain value for routing the fibre channel frame to another fibre channel switch element, an area value for routing the fibre channel frame to a port of the fibre channel switch that received the fibre channel frame, a virtual storage area network identifier for routing the fibre channel frame within a virtual storage area network and an arbitrated loop physical address (AL¯PA) value; and
   a hardware logic that receives a plurality of inputs and based on one of the inputs, a column select signal is generated, wherein the column select signal is used to select a value from one of toe plurality of columns to route the fibre channel frame; and wherein the column select signal is based on the output value generated by the hashing module; and wherein the output value is a pseudo random number value generated by the hashing module by applying a hash function on a field of a fibre channel frame header of the fibre channel frame for selecting the column value.

5. The fibre channel switch element of claim 4, wherein the hashing module uses a same field value from the fibre channel frame header for a same fibre channel exchange to generate the pseudo random number value.

6. The fibre channel switch element of claim 4, wherein the hash function is applied on an originator exchange identification field (OX_ID) of the fibre channel frame to route the fibre channel frame.

7. The fibre channel switch element of claim 4, wherein the hash function, to route the fibre channel frame, is used on at least one or more of a destination identifier field (D_ID), a source identifier field (S_ID) and a responder exchange identifier field (RX_ID), included in the fibre channel frame header for the fibre channel frame.

8. The fibre channel switch element of claim 4, wherein the hardware logic is a multiplexer and be plurality of inputs are a destination identifier field (D_ID), a source identifier field (S_ID), a virtual storage area network identifier, an originator exchange identification field (OX_D), the pseudo random number value generated by the hashing module, and a decode fibre channel header type field.

9. The fibre channel switch element of claim 8, wherein the decode fibre channel header type field is decoded and then a derived value is used to select a column from the look table.

10. The method of claim 1, wherein the bash function to route the fibre channel frame is used on at least one or more of a destination identifier field (D_ID), a source identifier field (S_ID) and a responder exchange identifier field (RX_ID), included in the fibre channel frame header for the fibre channel frame.

11. The method of claim 1, wherein the column select signal is generated after a plurality of fields are input to the hardware logic and one of the input fields is selected to generate the column select signal.

12. The method of claim 11, wherein the hardware logic is a multiplexer and the plurality of inputs are a destination identifier field (D_ID), a source identifier field (S_ID), a virtual storage area network identifier, an originator exchange identification field (OX_ID), the pseudo random number generated by the hashing module, and a decode fibre channel header type field.

13. A network system, comprising:
   host computing system for sending and receiving information;
   a least one storage system for storing information; and
   a least one fibre channel switch element configured to select a route from amongst a plurality of routes, for routing fibre channel frames in the network, where the fibre channel switch element includes:
   (a) at least one port for receiving and transmitting a fibre channel frame;
   (b) a look up table with a plurality of columns that are indexed by an output from a hashing module, a domain value for routing the fibre channel frame to another fibre channel switch element, an area value for routing the fibre channel frame to a port of the fibre channel switch that received the fibre channel frame, a virtual storage area network identifier for routing the fibre channel frame within a virtual storage area network and an arbitrated loop physical address (AL_PA) value; and c) a hardware logic that receives a plurality of inputs and based on one of the inputs, a column select signal is generated, wherein the column select signal is used to select a value from one of the plurality of columns to route the fibre channel frame; and wherein the column select signal is based on the output value generated by the hashing module; and wherein the output value is a pseudo random number value generated by the hashing module by applying a hash function on a field of a fibre channel frame header of the fibre channel frame for selecting the column value.

14. The system of claim 13, wherein the hashing module uses a same field value from the fibre channel frame header for a same fibre channel exchange to generate the pseudo random number value.

15. The system of claim 13, wherein the hash function, to route the fibre channel frame, is used on at least one or more of originator exchange identification field (OX_ID), a destination identifier field (D_ID), a source identifier field (S_ID and a responder exchange identifier field (RX_ID), included in a fibre channel frame header for the fibre channel frame.

16. The system of claim 13, wherein the hardware logic is a multiplexer and the plurality of inputs are a destination identifier field (D_ID) a source identifier field (S_ID), a virtual storage area network identifier, an originator exchange identification field (OX_ID), the pseudo random number value generated by the hashing module, and a decode fibre channel header type field.

* * * * *

UNITED STATES PATENT AND TRADEMARK OFFICE
CERTIFICATE OF CORRECTION

PATENT NO. : 7,646,767 B2  Page 1 of 2
APPLICATION NO. : 10/894978
DATED : January 12, 2010
INVENTOR(S) : Frank R. Dropps et al.

It is certified that error appears in the above-identified patent and that said Letters Patent is hereby corrected as shown below:

On page 6, in column 2, in field (57), in "Abstract", line 1, delete "fiber" and insert -- fibre --, therefor.

On page 6, in column 2, in field (57), in "Abstract", line 2, delete "fiber" and insert -- fibre --, therefor.

On page 6, in column 2, in field (57), in "Abstract", line 9, delete "fiber" and insert -- fibre --, therefor.

On page 6, in column 2, in field (57), in "Abstract", line 14, delete "fiber" and insert -- fibre --, therefor.

In column 1, line 27, after "Network"" insert -- ; --.

In column 6, line 22, delete ""PCI)" and insert -- "PCI" --, therefor.

In column 13, line 52, in claim 3, delete "(OX_ID" and insert -- (OX_ID) --, therefor.

In column 13, line 67, in claim 4, delete " (AL_PA) " and insert -- (AL_PA) --, therefor.

In column 14, line 4, in claim 4, delete "toe" and insert -- the --, therefor.

In column 14, line 27, in claim 8, delete "be" and insert -- the --, therefor.

In column 14, line 30, in claim 8, delete "(OX_D)," and insert -- (OX_ID), --, therefor.

In column 14, line 35, in claim 9, delete "look" and insert -- look up --, therefor.

In column 14, line 36, in claim 10, delete "bash" and insert -- hash --, therefor.

In column 14, line 54, in claim 13, before "host" insert -- a --.

Signed and Sealed this

Nineteenth Day of October, 2010

David J. Kappos
*Director of the United States Patent and Trademark Office*

In column 14, line 56, in claim 13, delete "a least" and insert -- at least --, therefor.

In column 14, line 57, in claim 13, delete "a least" and insert -- at least --, therefor.

In column 16, line 6, in claim 15, delete "(S_ID" and insert -- (S_ID) --, therefor.

In column 16, line 11, in claim 16, delete "(D_ID)" and insert -- (D_ID), --, therefor.

UNITED STATES PATENT AND TRADEMARK OFFICE
CERTIFICATE OF CORRECTION

| | | |
|---|---|---|
| PATENT NO. | : 7,646,767 B2 | Page 1 of 1 |
| APPLICATION NO. | : 10/894978 | |
| DATED | : January 12, 2010 | |
| INVENTOR(S) | : Dropps et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 978 days.

Signed and Sealed this

Sixteenth Day of November, 2010

David J. Kappos
*Director of the United States Patent and Trademark Office*